(12) United States Patent
DiMaria et al.

(10) Patent No.: US 11,546,472 B2
(45) Date of Patent: Jan. 3, 2023

(54) SYSTEM AND METHOD FOR A CLOUD CALLBACK PLATFORM

(71) Applicant: Virtual Hold Technology Solutions, LLC, Akron, OH (US)

(72) Inventors: Matthew DiMaria, Brentwood, TN (US); Matthew Donaldson Moller, Petaluma, CA (US); Thomas Spencer McCarthy-Howe, West Barnstable, MA (US); Shannon Lekas, Cushing, TX (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

(21) Appl. No.: 17/358,331

(22) Filed: Jun. 25, 2021

(65) Prior Publication Data

US 2021/0321002 A1 Oct. 14, 2021

Related U.S. Application Data

(63) Continuation-in-part of application No. 17/336,405, filed on Jun. 2, 2021, which is a continuation of
(Continued)

(51) Int. Cl.
*H04M 3/00* (2006.01)
*H04M 3/42* (2006.01)
(Continued)

(52) U.S. Cl.
CPC ........ *H04M 3/5231* (2013.01); *H04L 67/306* (2013.01); *H04M 3/5183* (2013.01)

(58) Field of Classification Search
CPC ............. H04M 3/42042; H04M 3/436; H04M 3/2281; H04M 3/42059; H04M 1/57; H04M 2203/6045; H04M 3/4365; H04M 2203/2011; H04M 3/42051; H04M 3/5158; H04M 2203/6027; H04M 7/123; H04M 7/1245; H04M 3/42102; H04M 7/006; H04M 1/66; H04M 2203/2038; H04M 2207/206; H04L 65/1069; H04L 65/1006; H04L 65/4007; H04L 65/1076;
(Continued)

(56) References Cited

U.S. PATENT DOCUMENTS 7,251,696 B1 * 7/2007 Horvitz ................ G06Q 10/107
709/228
9,106,724 B1 * 8/2015 Harris ..................... H04L 51/16
(Continued)

*Primary Examiner* — Kharye Pope
(74) *Attorney, Agent, or Firm* — Galvin Patent Law LLC; Brian R. Galvin

(57) ABSTRACT

A system and method for a cloud callback platform, comprising at least a profile manager, callback manager, interaction manager, media server, context analysis engine, and context aggregator mechanism, allowing user to call business, agents in contact centers, or other users who are connected a cloud callback platform, and, failing to connect to the individual they called, or by request, allow for an automatic callback object to be created, whereby the two users may be automatically called and bridged together at a time when both users are available, and a context summary report is sent to one or more user.

2 Claims, 16 Drawing Sheets

Related U.S. Application Data application No. 17/011,248, filed on Sep. 3, 2020, now Pat. No. 11,032,424, which is a continuation-in-part of application No. 16/995,424, filed on Aug. 17, 2020, now abandoned, which is a continuation-in-part of application No. 16/896,108, filed on Jun. 8, 2020, now abandoned, which is a continuation-in-part of application No. 16/836,798, filed on Mar. 31, 2020, now Pat. No. 10,992,811, application No. 17/358,331, which is a continuation-in-part of application No. 16/591,096, filed on Oct. 2, 2019, said application No. 16/836,798 is a continuation of application No. 16/542,577, filed on Aug. 16, 2019, now Pat. No. 10,609,218, said application No. 16/896,108 is a continuation-in-part of application No. 16/152,403, filed on Oct. 4, 2018, which is a continuation-in-part of application No. 16/058,044, filed on Aug. 8, 2018, now Pat. No. 11,012,568, said application No. 16/591,096 is a continuation of application No. 15/411,534, filed on Jan. 20, 2017, now Pat. No. 10,455,090, said application No. 16/058,044 is a continuation-in-part of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, and a continuation-in-part of application No. 13/446,758, filed on Apr. 13, 2012, now Pat. No. 8,792,866, said application No. 13/479,870 is a continuation-in-part of application No. 12/320,517, filed on Jan. 28, 2009, now Pat. No. 8,213,911, said application No. 13/446,758 is a continuation of application No. 12/320,517, filed on Jan. 28, 2009, now Pat. No. 8,213,911.

(60) Provisional application No. 62/858,454, filed on Jun. 7, 2019, provisional application No. 62/820,190, filed on Mar. 18, 2019, provisional application No. 62/291,049, filed on Feb. 4, 2016.

(51) Int. Cl.
  *H04L 12/66* (2006.01)
  *H04M 3/523* (2006.01)
  *H04L 67/306* (2022.01)
  *H04M 3/51* (2006.01)

(58) Field of Classification Search
  CPC .. H04L 65/1079; H04W 12/72; H04W 12/02; H04W 12/06; H04W 76/10; H04W 12/12
  USPC .... 379/142.01, 142.05, 142.04, 189, 207.13, 379/114.14, 201.11; 370/352, 356
  See application file for complete search history.

(56) References Cited

U.S. PATENT DOCUMENTS

| | | | |
|---|---|---|---|
| 10,051,011 B2 | 8/2018 | Boerjesson et al. | |
| 10,917,520 B1* | 2/2021 | T. G | H04M 3/5233 |
| 2005/0182672 A1* | 8/2005 | Hemm | H04M 3/523 |
| | | | 379/265.02 |
| 2006/0002538 A1* | 1/2006 | Dezonno | H04M 3/5158 |
| | | | 379/210.01 |
| 2006/0256949 A1* | 11/2006 | Noble, Jr. | H04M 3/5231 |
| | | | 379/265.01 |
| 2007/0280460 A1* | 12/2007 | Harris | H04M 3/5166 |
| | | | 379/201.01 |
| 2010/0190477 A1* | 7/2010 | Williams | G06Q 10/02 |
| | | | 455/414.1 |
| 2011/0176670 A1* | 7/2011 | Kaplan | H04W 4/16 |
| | | | 379/210.01 |
| 2013/0346595 A1* | 12/2013 | Bulut | H04L 67/2833 |
| | | | 709/224 |
| 2014/0153703 A1* | 6/2014 | Desai | H04M 3/5166 |
| | | | 379/88.01 |
| 2014/0226809 A1* | 8/2014 | King | H04M 3/5238 |
| | | | 379/265.11 |
| 2017/0054846 A1* | 2/2017 | Dervan | H04M 3/5141 |
| 2017/0289355 A1* | 10/2017 | Mezhibovsky | H04M 3/5238 |
| 2020/0153969 A1* | 5/2020 | Dougherty | G10L 15/26 |
| 2020/0228657 A1* | 7/2020 | Lee | H04M 3/42076 |

\* cited by examiner

SYSTEM AND METHOD FOR A CLOUD CALLBACK PLATFORM

CROSS-REFERENCE TO RELATED APPLICATIONS

Priority is claimed in the application data sheet to the following patents or patent applications, the entire written description of each of which is expressly incorporated herein by reference in its entirety.
Ser. No. 17/336,405
Ser. No. 17/011,248
Ser. No. 16/995,424
Ser. No. 16/896,108
Ser. No. 16/836,798
Ser. No. 16/542,577
62/820,190
62/858,454
Ser. No. 16/152,403
Ser. No. 16/058,044
Ser. No. 14/532,001
Ser. No. 13/659,902
Ser. No. 13/479,870
Ser. No. 12/320,517
Ser. No. 13/446,758
Ser. No. 12/320,517
Ser. No. 16/591,096
Ser. No. 15/411,534
62/291,049

BACKGROUND

Field of the Art

The disclosure relates to the field of contact center technology, and more particularly to the field of cloud-implemented automated callback systems and data message routing.

Many businesses use groups of service representatives for communicating with clients who initiate communications with the business, such as by telephone calls or text based messaging. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Discussion of the State of the Art

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while a connection, be it a phone call, web chat, video conference, or other interaction type, is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exasperating, it does not address the inconvenience of having to navigate an irritatingly slow and usually complicated voice prompt menu to enter the queue.

What is needed is a system and method for providing a cloud callback platform and related services that overcome the limitations of the prior art noted above.

SUMMARY

A system and method for a cloud callback platform, comprising at least a profile manager, callback manager, interaction manager, media server, context analysis engine, and context aggregator mechanism, allowing user to call business, agents in contact centers, or other users who are connected a cloud callback platform, and, failing to connect to the individual they called, or by request, allow for an automatic callback object to be created, whereby the two users may be automatically called and bridged together at a time when both users are available, and a context summary report is sent to one or more user.

Accordingly, the inventor has conceived and reduced to practice, a system for cloud callback platform, comprising: a computing device comprising a memory and a processor; a callback manager comprising a first plurality of programming instructions stored in the memory and operating on the processor, wherein the first plurality of programming instructions, cause the computing device to: initiate a session when first contact is made with a callback requestor; receive a request for a callback to a callback recipient from a callback requester; instantiate a callback object; send session attributes to at least one of a context analysis engine and a data message aggregator; obtain an context summary report; link the context summary report and the callback object; provide the context summary report to the callback recipient at a scheduled callback time; execute callback requests; and a context analysis engine comprising a second plurality of programming instructions stored in the memory and operating on the processor, wherein the second plurality of programming instructions, cause the computing device to: receive the session attributes; generate, in response to the session attributes, context content pertaining to at least one of the callback requestor, the callback recipient, and the session attributes; forward the context content to a data message aggregator; and a context aggregator mechanism comprising a third plurality of programming instructions stored in the memory and operating on the processor, wherein the third plurality of programming instructions, cause the computing device to: generate an context summary report by parsing, aggregating, and formatting the context content; and send the context summary report to the callback manager.

Accordingly, the inventor has conceived and reduced to practice, a method for cloud callback platform, comprising the steps: initiating a session when first contact is made with a callback requestor; receiving a request for a callback to a callback recipient from a callback requester; instantiating a callback object; sending session attributes to a context analysis engine; obtaining an context summary report; linking the context summary report and the callback object; providing the context summary report to the callback recipient at a scheduled callback time; executing callback requests; receiving the session attributes; generating, in response to the session attributes, context content pertaining to at least one of the callback requestor, the callback recipient, and the session attributes; forwarding the context content to a data message aggregator; generating an context summary report by parsing, aggregating, and formatting the context content; and sending the context summary report to the callback manager.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
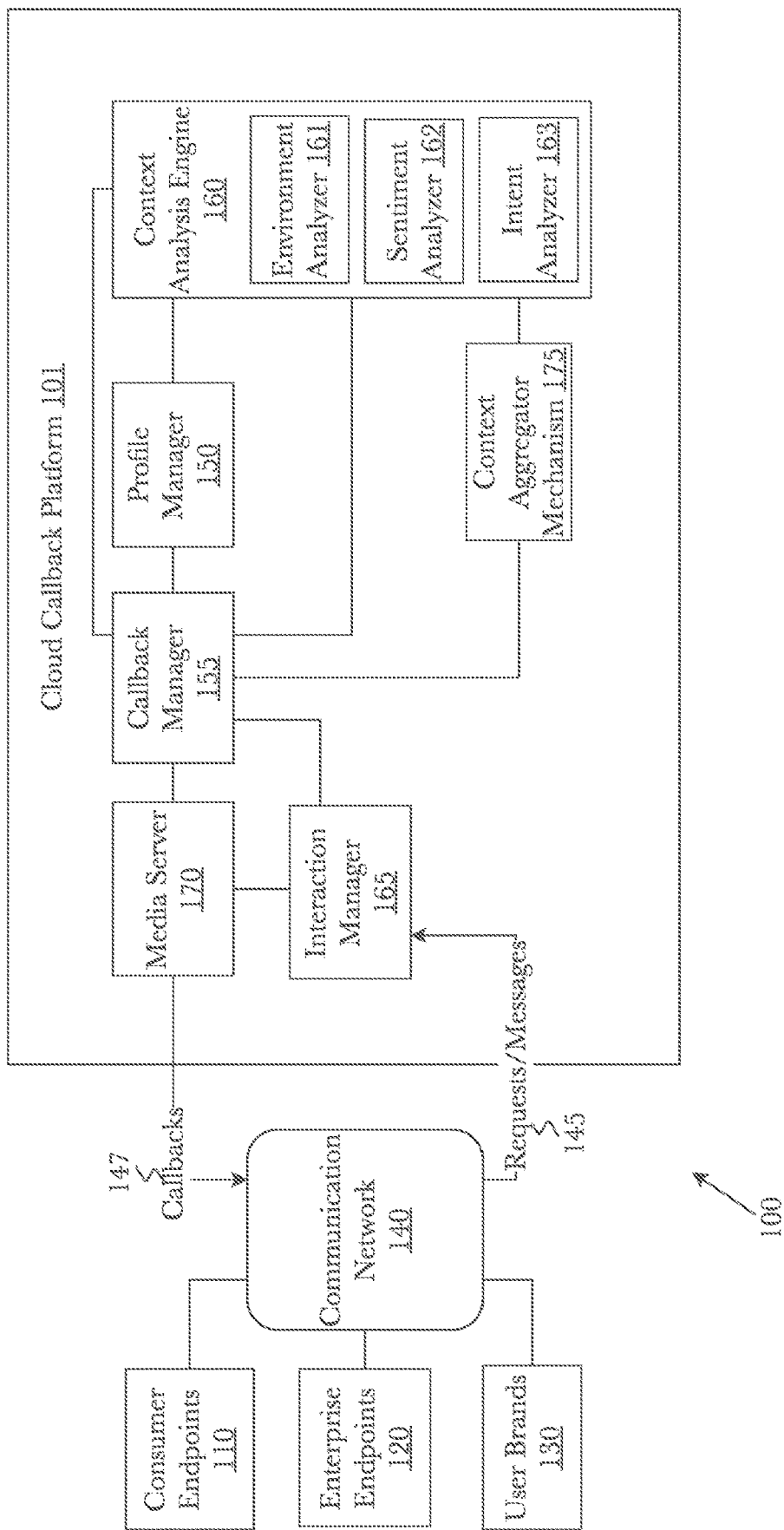
FIG. 1 is a block diagram illustrating an exemplary system architecture for a cloud callback platform, according to one embodiment.

The inventor has conceived, and reduced to practice, a cloud callback platform, comprising at least a profile manager, callback manager, interaction manager, media server, context analysis engine, and context aggregator mechanism, allowing user to call business, agents in contact centers, or other users who are connected a cloud callback platform, and, failing to connect to the individual they called, or by request, allow for an automatic callback object to be created, whereby the two users may be automatically called and bridged together at a time when both users are available, and a context summary report is sent to one or more user.

With the proliferation of mobile computing devices clients (e.g., consumers) are increasingly engaging with service agents via text based messaging such as a web chat, text message, email, etc. As is often the case, as few as one or more messages may be exchanged between a client and a service agent before a callback is requested. If a client is messaging with a service agent and the client requests a callback, the callback is generally scheduled with a different service agent other than the agent the client was messaging with. This can lead to a situation where a client, who has already disclosed information regarding the reason for the callback via messages sent to a first service agent, may have to repeat this information again to a second service agent when the scheduled callback occurs. Similarly, a client may be calling a contact center and then navigate voice menus to be routed properly, but the client may end up requesting a callback or otherwise disconnecting from the call. In this situation, any voice menu option selections or responses made by the client prior to a callback request or disconnection may provide useful information about why the client was trying to contact a service agent.

When a client makes a first contact (e.g., voice call or text data message) with a contact center, any input (or attributes thereof) provided may be analyzed to determine context content data. Attributes may include, but are not limited to, a username, phone number, device identifier, handle, email, message or call subject, end user, etc. The context content generated or derived from any messages, calls, and attributes may be parsed, compiled, and formatted into a summary report which may be sent to a callback recipient (i.e., service or contact center agent) so that they may have a basic understanding of the client and the clients reason for requesting a callback. This may allow a service agent (or bot or script or some combination) to plan for or proactively address or resolve a callback requestor's (e.g., client) reason for making the first contact. This may all be facilitated by an embodiment which provides a cloud resident callback and routing platform that receives, via a communication network, data messages and callback requests, which analyzes, schedules, and executes various callback requests, and which generates and routes context summary reports to an appropriate contact center agent computing device.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to an instance of an individual being contacted after their initial contact was unsuccessful. For instance, if a first user calls a second user on a telephone, but the second user does not receive their call for one of numerous reasons including turning off their phone or simply not picking up, the second user may then place a callback to the first user once they realize they missed their call. This callback concept applies equally to many forms of interaction that need not be restricted to telephone calls, for example including (but not limited to) voice calls over a telephone line, video calls over a network connection, or live text-based chat such as web chat or short message service (SMS) texting. While a callback (and various associated components, methods, and operations taught herein) may also be used with an email communication despite the inherently asynchronous nature of email (participants may read and reply to emails at any time, and need not be interacting at the same time or while other participants are online or available), the preferred usage as taught herein refers to synchronous communication (that is, communication where participants are interacting at the same time, as with a phone call or chat conversation).

"Callback object" as used herein means a data object representing callback data, such as the identities and call information for a first and second user, the parameters for a callback including what time it shall be performed, and any other relevant data for a callback to be completed based on the data held by the callback object.

"Latency period" as used herein refers to the period of time between when a Callback Object is created and the desired Callback is initiated, for example, if a callback object is created and scheduled for a time five hours from the creation of the object, and the callback initiates on-time in five hours, the latency period is equal to the five hours between the callback object creation and the callback initiation.

"Brand" as used herein means a possible third-party service or device that may hold a specific identity, such as a specific MAC address, IP address, a username or secret key which can be sent to a cloud callback system for identification, or other manner of identifiable device or service that may connect with the system. Connected systems or services may include a Private Branch Exchange ("PBX"), call router, chat server which may include text or voice chat data, a Customer Relationship Management ("CRM") server, an Automatic Call Distributor ("ACD"), or a Session Initiation Protocol ("SIP") server.

Conceptual Architecture

FIG. 1 is a block diagram illustrating an exemplary system 100 architecture for a cloud callback platform, according to one embodiment. The system 100 may include at least one cloud callback platform 101. The cloud callback platform 101 may include at least one callback manager 155, at least one profile manager 150, at least one media server 170, at least one interaction manager 165, at least one context analysis engine 160, and at least one context aggregator mechanism 175. The cloud callback platform 101 may be or include one or more data processing systems, servers, virtual servers, or computing devices. The cloud callback platform 101 may include hardware (e.g., processors of one or more servers), as well as scripts or programs executed by the hardware, and combinations thereof. The cloud callback platform 101 may reside (e.g., physically or logically disposed) in a communication network path between at least one consumer endpoint 110 (e.g., a client or end user or customer computing device) or user brand 130 and at least one enterprise endpoint 120 (e.g., contact center or control computing device, telephone, tablet, cellphone, a switch, etc.). For example, the cloud callback system 101 may communicate (e.g., via a Local Area Network [LAN], Wide-Area Network [WAN], the internet, a cloud environment, or other computer network) with consumer endpoints 110, enterprise endpoints 120, and with user brands 130.

According to an embodiment, cloud callback platform 101 may receive requests or data messages 145 via a plurality of communication networks 140 such as public switched telephone network (PSTN), the internet, fixed line (e.g., from the signaling channel of an acoustic modem), wireless network, VoIP, cellular, fiber optic, short message service (SMS) or public or proprietary text messaging networks. These requests may comprise a variety of communication or interaction types, for example including, but not limited to, voice calls over a telephone line, video calls over a network connection, or live text-based chat such as web chat or SMS texting via PTSN or network connection. Such communication networks 140 may be connected to a plurality of consumer endpoints 110, enterprise endpoints 120, and user brands 210, according to the particular architecture of the communication network involved. Exemplary consumer endpoints 110 may include, but are not limited to, traditional telephones, cellular telephones, mobile tablet computing devices, laptop computers, or desktop personal computers (PC). Such devices may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 100 according to an embodiment.

Various communication networks such as a PSTN or the Internet, may be further connected to a plurality of enterprise endpoints 120, which may comprise cellular telephones, telephony switch, desktop environment, internal LAN or WAN, and mobile devices such as tablet computing device. A desktop environment may include both a telephone and a desktop computer, which may be used as a network bridge to connect a telephony switch to an internal LAN or WAN, such that additional mobile devices such as tablet PC may utilize the switch to communicate with PSTN. The telephone may be connected to the switch or it may be connected directly to PSTN. It will be appreciated that the described arrangement is exemplary, and a variety of arrangements that may comprise additional devices known in the art are possible, according to an embodiment.

A collection of user brands 130 may be present either singly or in some combination, possibly including a Public Branch Exchange ("PBX"), a Session Initiation Protocol ("SIP") server, a Customer Relationship Management ("CRM") server, a call router, or a chat serve, or some combination of these brands. These brands 130 may communicate over a combination of, or only one of, a communication network such as a PSTN, and the Internet, to communicate with other devices including a cloud callback platform 101, a company phone, or a personal cellular phone. A SIP server is responsible for initiating, maintaining, and terminating sessions of voice, video, and text or other messaging protocols, services, and applications, including handling of PBX phone sessions, CRM server user sessions, and calls forwarded via a call router, all of which may be used by a business to facilitate diverse communications requests from a user or users, reachable by phone over either PSTN or the Internet. A chat server may be responsible for maintaining one or both of text messaging with a user, and automated voice systems involving technologies such as an Automated Call Distributor ("ACD"), forwarding relevant data to a call router and CRM server for further processing, and a SIP server for generating communications sessions not run over the PSTN. Various systems may also be used to monitor their respective interactions (for example, chat session by a chat server or phone calls by an ACD or SIP server), to track agent and resource availability for producing EWT estimations.

Cloud callback platform101 may respond to requests or data messages 145 received from communications networks 140 with callbacks 147 appropriate to the technology utilized by such networks, such as data or Voice over Internet Protocol (VOIP) callbacks sent to Internet, or time-division multiplexing (TDM) such as is commonly used in cellular telephony networks such as the Global System for Mobile Communications (GSM) cellular network commonly used worldwide, or VOIP callbacks to PSTN. Data callbacks may be performed over a variety of Internet-enabled communications technologies, such as via e-mail messages, application pop-ups, or Internet Relay Chat (IRC) conversations, and it will be appreciated by one having ordinary skill in the art that a wide variety of such communications technologies are available and may be utilized according to the invention.

VOIP callbacks may be made using either, or both, traditional telephony networks such as PSTN or over VOIP networks such as Internet, due to the flexibility to the technology involved and the design of such networks. It will be appreciated that such callback methods are exemplary, and that callbacks may be tailored to available communications technologies according to an embodiment.

Additionally, cloud callback platform 101 may receive estimated wait time (EWT) information from an enterprise 120 such as a contact center. This information may be used to estimate the wait time for a caller before reaching an agent (or other destination, such as an automated billing system), and determine whether to offer a callback proactively before the customer has waited for long. EWT information may also be used to select options for a callback being offered, for example to determine availability windows where a customer's callback is most likely to be fulfilled (based on anticipated agent availability at that time), or to offer the customer a callback from another department or location that may have different availability. This enables more detailed and relevant callback offerings by incorporating live performance data from an enterprise, and improves customer satisfaction by saving additional time with preselected recommendations and proactively-offered callbacks.

When a customer (consumer or client or end user) calls from a mobile device or uses some communication application such as (for example, including but not limited to) SKYPE™ or instant messaging, which may also be available on a laptop or other network endpoint other than a cellular phone, they may be forwarded to brands 130 operated by a business in the manner described herein. For example, a cellular phone call my be placed over PSTN before being handled by a call router and generating a session with a SIP server, the SIP server creating a session with the cloud callback platform 101 with a profile manager 150 if the call cannot be completed, resulting in a callback being required.

A profile manager 150 manages the storage, retrieval, and updating of user profiles, including global and local user profiles. User profiles may include information such as (but not limited to) user devices, services, or subscriptions, an account identifier (e.g., phone number), serial number or other device identifier, a handle or other reference to a resource or username in a communication system (@username of social network, or communication service) or email address, messaging history including any past or ongoing messaging sessions, contextual content associated with a messaging session, and the like. The profile manager 150, which may be located in the cloud callback platform 101 receives initial requests to connect to cloud callback platform 101, and forwards relevant user profile information to a callback manager 155, which may further request context data from a context analysis engine 160.

The context analysis engine 160 may include at least one environment analyzer 161, at least one sentiment analyzer 162, and at least one intent analyzer 163. Context analysis engine 160 may determine, generate, or derive contextual content or attributes associated with a call, data message, or session. Contextual content may include, but are not limited to, attributes derived from a call, data message, or session, such as end user sentiment, emotions, source data, subject matter or topic area of data messages, intended destination data, end user content, end user identification data, intent, a relationship to a second data message, or suggested contact center agent computing device to receive the data message, among other info. Environmental context data may include (for example, and not limited to) recorded information about when a callback requester or callback recipient may be suspected to be driving or commuting from work, for example, and may be parsed from online profiles or online textual data, using an environment analyzer 161.

Present in this embodiment is a sentiment analyzer 162, which determines or derives sentiment contextual content which may indicate attributes such as end user sentiment or emotions. For example, a customer and contact center agent are having a text chat communication and the cloud callback platform 101 sends a text data message scheduling a callback at 3:15 in the afternoon, but that callback time does not work for the customer so they reply with an thumbs down emoji. The sentiment analyzer 162 may determine the thumbs down emoji indicates a negative sentiment and the cloud callback platform 101 can reschedule the callback 147 and send another text data message with the updated callback time. Also present in this embodiment is an intent analyzer 163, which analyzes spoken words or typed messages from a user that initiated the callback request, to determine or derive their intent for a callback or the intent of a data message. Intent contextual content may include intended destination data, subject matter or topic area of the callback request or data message. For example, their intent may be to have an hour-long meeting, which may factor into the decision by the cloud callback platform 101 to place a call shortly before one or both users may be required to start commuting to or from their workplace. Context analysis engine 160 or its analyzers 161, 162, 163 may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

A callback manager 155 centrally manages all callback requests and sessions, creating a callback programming object which may be used to manage the data for a particular callback or initiating a session which may be used to manage the data for a particular data message. For example, when a customer (consumer, client, or callback requester) makes first contact with an enterprise, such as a contact center, via a voice call or text based data message or some other form of communication, the callback manager 155 initiates a session which stores all interactions between the customer and the enterprise. For example, a customer calls a contact center for support and may have to navigate a series of call menus to be routed to the correct department for assistance, but the customer at any point may request a callback or otherwise disconnect the phone call. A session is created for that call interaction and any call menu selections chosen by the customer are stored as session attributes. Similarly, a customer may send one or more data messages to a contact center for support, resulting in the creation of a session facilitating a text based conversation between the customer and a contact center agent, and the customer may at some point request a callback. The messages contained within the session may be considered session attributes. The callback manager 155 may send session attributes to a context analysis engine 160 to determine, generate, or derive contextual content related to at least the callback requester, at least the callback recipient, and at least the session attributes, or some combination therein. Contextual content generated by the context analysis engine 160 may be forwarded to a context aggregator mechanism 175 which generates a context summary report by combining the context content with one or more scripts that may be used by a callback recipient (i.e., enterprise endpoint, contact center agent or bot, etc.) to facilitate timely resolutions to the subject of the callback request. For example, the context content may indicate that the customer (callback requester) was making contact about poor internet connectivity, they have a neutral sentiment, and the wireless device the customer is using hasn't had its firmware updated since a new firmware update was published. In response, the context aggregator mechanism 175 may identify one or more pre-configured scripts which may allow a callback recipient to proactively manage and remedy the customer's poor internet connection, for instance, a script may have the callback recipient push the firmware update onto the wireless device remotely and then all the customer would have to do is reset the device. The context summary report may then be sent to the callback manager 155 which can link the context summary report to a callback object. The context summary report may be used in part to identify appropriate callback recipients most qualified to handle the reason for the callback. The callback manager 155 may then provide the context summary report to the callback recipient at the scheduled callback time. For example, the context summary report may be sent to contact center agent computing device at or a few minutes before a scheduled callback time so that the contact center agent may familiarize there self with the context of the callback, so that they may be more responsive to the requests of the customer.

The callback manager 155 also communicates with an interaction manager 165 which intercepts data messages and handles requests to make calls and bridge calls, which go out to a media server 170 which either routes the context summary report to an available contact center agent or actually makes the calls as requested. For example, interaction manager 165 may receive a call from a callback requester, retrieve callback parameters for that callback requester from the callback manager 155, and cause the media server 170 to make a call to a callback recipient while the callback requester is still on the line, thus connecting the two parties. After the call is connected, the callback programming object used to make the connection may be deleted. The interaction manager 165 may subsequently provide changed callback parameters to the callback manager 155 for use or storage. In this way, the media server 170 may be altered in the manner in which it makes and bridges calls when directed, but the callback manager 155 does not need to adjust itself, due to going through an intermediary component, the interaction manager 165, as an interface between the two. A media server 170, when directed, may place calls and send data messages, emails, or connect voice over IP ("VoIP") calls and video calls, to users over a PSTN, the Internet, or some other appropriate communication network 140. Callback manager 155 may work with a user's profile as managed by a profile manager 150, with contextual content from a context analysis engine 160 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 165 to physically place and bridge the calls with a media server 170. In this way, a user may communicate with another user on a PBX system, or with automated services hosted on a chat server, and if they do not successfully place their call or need to be called back by a system, a cloud callback platform 101 may find an optimal time to bridge a call between the callback requestor and callback recipient, as necessary.

In addition to receiving, scheduling, and executing voice callbacks the cloud callback platform 101 may receive a data message. For example, the data message sent from the customer computing device may be sent to a phone number (or other destination identifier such as social media account) of a contact center. Prior to receipt of the data message by a contact center agent computing device or other enterprise endpoint 120 associated with the destination identifier, the interaction manager 165 (or other cloud callback platform 101 component) may intercept (e.g., receive, hook, access, or otherwise obtain) the data message. Once a data message has been received by the interaction manager 165 the profile manager 150 may send relevant profile information to the callback manager 155 which may initiate a session responsive to the received data message. The callback manager 155 may copy or replicate the data message to generate a replicated data message. The replicated data message may include the subject matter (i.e., session attributes) of the data message, and may also include an identifier indicating that it is a replication or indicating the source (or other information) of the data message. For example, the callback manager 155 may tag the replicated data message with a unique identifier that indicates the source of the data message. The callback manager 155 may tag the corresponding original data message with the same or a different (e.g., related) unique identifier indicating that the data messages are copies of one another. The callback manager 155 may provide the replicated data messages(including any identifiers) to the profile manager 150 for storage and retrieval by components of the cloud callback platform 101. The identifiers can be stored with the session or linked to the sessions, e.g., via a lookup table.

The cloud callback platform 101 may receive a data message via the communication network 140. The data message may include a text message sent from a consumer endpoint 110 (e.g., customer computing device) to an enterprise endpoint 120 (e.g., contact center environment intended for a contact center agent computing device) or user brand 130. The data message may be text or image based. The data message may also be an asynchronous voice transmission (e.g., a voicemail or voice message) that is recorded by the customer computing device and then transmitted, rather than a live voice conversation. For example, the end user at the customer computing device may have a question about a cable television bill and may send a text or other text-based data message, or a voicemail message, to a contact center to obtain assistance from a representative. This text based data message can be received by the cloud callback platform 101. The voicemail message may be translated to text by the customer computing device, or can be provided as an audio file. Data messages can be asynchronous, e.g., one-way, separated in time or having different subject matter content.

The text based data message (or alternatively, a voice call, voice mail, or session) can include one or more attributes. Attributes of the data message may indicate a source of the data message, such the device from which the data message originated, a network account or social network account from which the data message originated, or an individual from which the data message originated. For example, packet or other protocol based transmissions of data messages can include a media access control address, network interface controller, Ethernet hardware address, programmed address, or other identifier that identifies the consumer endpoint 110 (e.g., a smart phone or tablet or other computing device).

For example, the attribute can include a handle or other reference to a resource or username in a communication system (e.g., '@username' of a social network or communication service) or an email address. The attribute can also include an account identifier (e.g., a phone number of a smartphone or identifier of a social media or email account), serial number, or other device identifier. The attribute can accompany the text based data message transmitted from a consumer endpoint 110 (e.g., customer computing device) and received by the cloud callback platform 101, e.g., on behalf of a contact center. For example, the attribute can be included within or appended to packet or other protocol based transmissions of the data message through the network 140. The attribute can also be indicated by metadata or header information that is part of or transmitted with the data message. Characteristics may be used by the cloud callback platform 101 profile manager 150 to identify and located the correct profile of the originator of the data message. The attribute can also include or be indicated by subject matter of the data message. For example, cloud callback platform 101 may determine the attribute of the data message from the subject matter (e.g., words, symbols, phrases, punctuation, abbreviations, misspellings, emojis, or keywords) of the data message that can indicate attributes such as an end user sentiment, such as happy, content, angry, upset, rushed, or annoyed.

The context analysis engine 160 may parse or evaluate the data message (including any metadata such as a location, keyword, topic, or phone number) to identify at least one attribute of the data message (e.g., subject matter of the data message, or an identifier of the end user or of the customer computing device). For example, data messages may include source and destination addresses, formatted such as @thomas for social networks or +15085551212 for mobile telcom networks, along with the payload of the message, such as "I have a problem with my bill", and various meta-data about the message such as the time of creation, a unique identifier for the message, or a Boolean flag indicating whether or not the data message has been delivered before. Based on these attributes, the context analysis engine 160 may identify attributes of the data messages, and can generate corresponding contextual content, such as a sentiment analysis or determination for the data message. The handle identifier "@Thomas" and the destination identifier "@Cable Co" are examples and the attributes of the data messages. The attributes of the data message may include other identifiers, such as subject matter terms, a phone number of the customer computing device, a device identifier of the customer computing device, destination phone numbers or other identifiers of the entity that is associated with the data message (e.g., that the end user is trying to reach).

The cloud callback platform 101 may generate, (e.g., identify, or obtain) contextual content of or corresponding to the session or a data message. For example, the context analysis engine 160 may parse or analyze the replicated data message or the original data message (or attributes/attributes thereof) to identify contextual content. The contextual content may indicate a sentiment or other attribute of the end user at the consumer endpoint 110 that originated the data message, or may indicate a topic or category of content of the data message, for example. The context analysis engine 160 may link the contextual content with the data message (or replicated data message) and can provide the contextual content to the profile manager 150 for storage and subsequent retrieval.

The callback manager 155 may fork (e.g., copy or replicate) the session or data message. The callback manager 155 may provide (a copy of) the data message to the context analysis engine 160, and may provide (another copy of) the data message to the aggregator mechanism 175. The interaction manager 165 may include a processor, controller, or logic circuitry that can execute a script or application to hook or intercept the data message and the callback manager 155 to provide copies of the data message to the context analysis engine 160 or to the context aggregator mechanism 175. For example, the intercepted data message can be tagged by the cloud callback platform 101 with a globally unique identifier to track the original source of the duplicated data message before passing the original message to the aggregator mechanism 175. The original data message can then be duplicated and tagged with a second globally unique identifier and passed to the context analysis engine 175.

When a data message is received by the cloud callback platform 101 the callback manager 155 initiates and manages a session to facilitate interactive information exchange. For example, a cable customer may login on to a cable provider's website and send a data message (e.g., "My cable bill is too expensive") via a pop-up chat window to a customer support contact center. The received data message or session details may be sent to a context aggregator mechanism 175 and to a context analysis engine 160. The context analysis engine 160 may parse the data message to determine or derive contextual content for or of data messages. For instance, from the data message "My cable bill is too expensive" the context analysis engine 160 may determine that the customer wants to be directed to billing and that he/she has negative sentiment. This contextual content may be sent to the profile manager 150 for storage or sent to the context aggregator mechanism 175 which can combine (e.g., merge, integrate, associate, or append) the contextual content with the data message (original or replicated) to create a context summary report. The context summary report may be one or more than one data packet (or other protocol based) data structure. The cloud callback platform 160 may provide the context summary report to at least one contact center agent computing device for display, e.g., via a live interaction component of the contact center computing device, or other enterprise endpoints 120 or user brands 130. Cloud callback platform 101 by enhancing or modifying data messages to include contextual content reduces the number of packet (or other protocol based) computer network transmissions that may otherwise occur due to inefficient routing to, for example, unnecessary additional data message communications or unnecessary transfers or hops to incorrect destinations (e.g., wrong contact center agent computing device) before arriving at the correct destination. This saves bandwidth, reduces latency, saves power, and results in faster communications between the end user computing device and the correct contact center computing device.

When the context summary report is received at an enterprise endpoint 120, such as a contact center agent computing device, it may be displayed on some live interaction component of the computing device. The context summary report provides the contact center agent computing device with the original data message and with any contextual content determined or derived by the cloud callback platform 101. The contextual content may provide information that allows a contact center agent (or bot or script or some combination) to proactively address the reason why the customer sent a data message.

Figure 2:
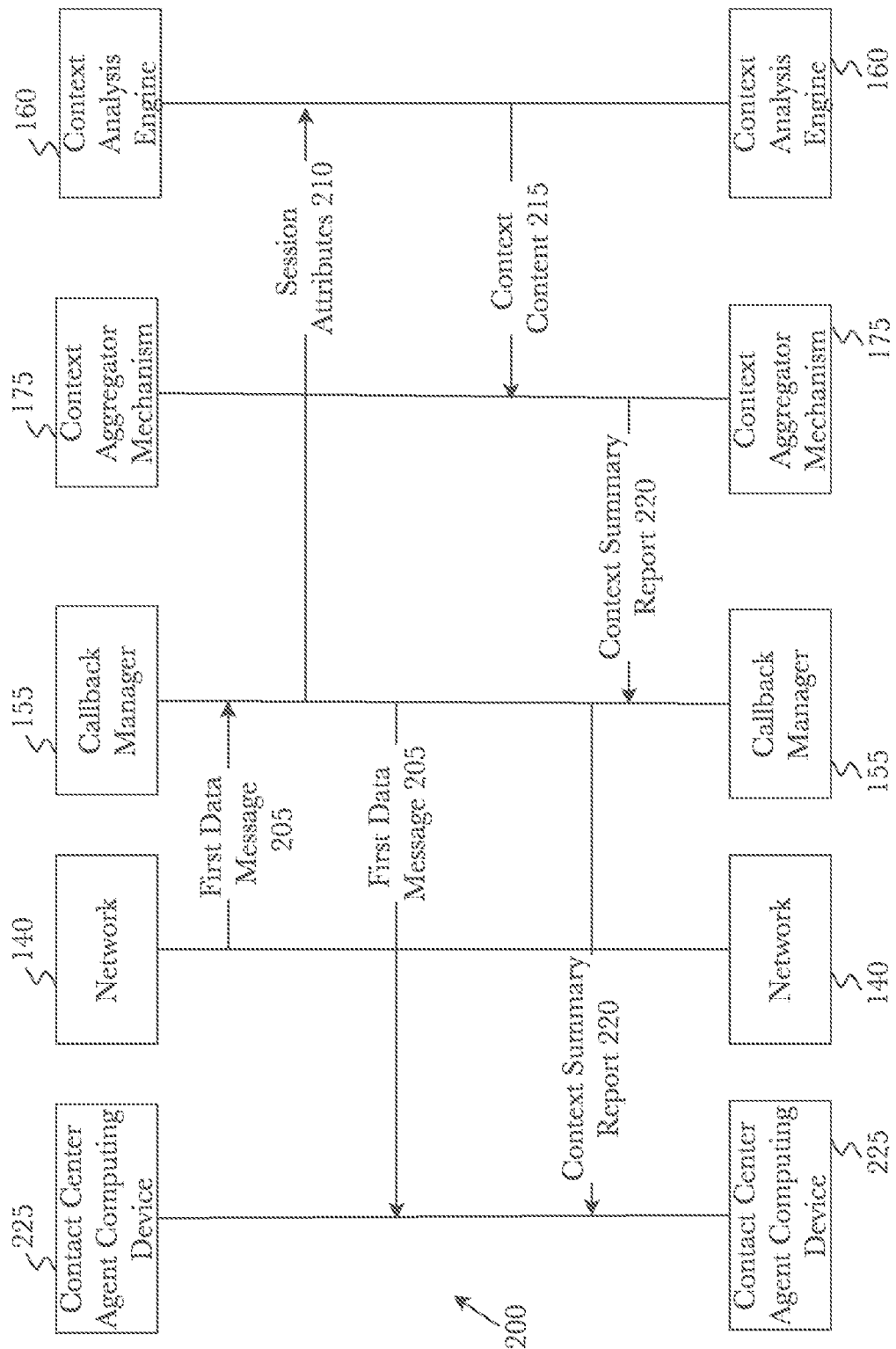
FIG. 2 is a message flow diagram illustrating the exchange of messages and data between components of a cloud callback platform, according to an embodiment.

FIG. 2 is a functional diagram of a system 200 for a cloud callback platform, generating a context summary report, according to an embodiment. The system 200 may include a contact environment (e.g., call center, customer service, or help desk environment that includes the ability to route, service, and respond to voice calls or non-voice data message communications). A customer, via a computing device, may make contact with a contact center by sending at least one (first) data message 205 via a communication network 140. The data message 205 may include at least one attribute 210, such as a source, destination, subject matter, end user, or computing device information from which context content 215 may be determined or identified. For example, the first data message 205 may include a message to an internet service provider contact center that states "I'm not happy with my internet service" and can include metadata or other information such as a user identifier, social media handle, or phone number that identifies the source of the first data message 205. The callback manager 155 may initiate a session when a first data message 205 is received by the cloud callback platform 101. The callback manager 155 may replicate and store the first data message 205. The callback manager 155 may provide the data message 205, a replication of the data message, or session details 210 to a context analysis engine 160. The callback manager 155 may provide the session or first data message 205 (with or without a context summary 220) to the contact center agent computing device 225.

The cloud callback platform 101 in the contact center environment can determine that data messages are (or are not) part of a pre-existing session. The session may be a voice connection or text based communication session between the end user and a contact center agent or other representative at the contact center agent computing device 225. Multiple individual data messages 205 can be aggregated or clustered together to form or define a session. For example, a series of back and forth text messages between the customer computing device and the contact center agent computing device 225 that pertain to common subject matter such as a billing query can be identified by the callback manager 155 as a session. Multiple, different data messages 205 from the same session can be evaluated by the context analysis engine 160 to determine context content 215. The callback manager 155 can provide the sessions for storage in and retrieval from a profile manager 150.

The cloud callback platform 101 may assemble or aggregate data messages 205 into logical groups called sessions. Unlike other real time communications modes like audio and video that have an explicit start and stop to a conversation, data messages via messaging based networks can be considered stateless, e.g., without explicit indications of beginnings and ends of conversations, such as disconnecting a voice call. The callback manager 155 can mark the beginning and end of sessions, e.g., conversations. The callback manager 155 may append newly received data messages 205 to a pre-existing session, or can create a new session for the data message 205. The context aggregator mechanism 175 can create context summary reports 220 that include data messages 205 as well as context content 215. The cloud callback platform 101 ma also collect meta-data information about the source of the inbound data message 205, including attributes such as the network identifier, subject matter, words, phrases, symbols, keywords, messaging network, device location, and in the case of social messaging or with end user consent, details such as the parties name or telephone number. The cloud callback platform 101 may send a confirmation receipt message to the originating party (e.g., the customer computing device), responsive to receipt of a data message 205.

The context aggregator mechanism 175 may receive from the context analysis engine 160 context content 215 which may be combined with one or more pre-configured scripts to generate a context summary report 220. The context summary report 220 may parse, compile, and format the received context content 215 into a human or machine readable report. The context summary 220 may be sent to the callback manager 155 where it may be linked to a callback object and stored with a user profile in a profile manager 150. The callback manager 155 may send the context summary report 220 to a contact center agent computing device 225 either at or before a callback is scheduled.

Providing the context summary reports 220 that include the data message 205 and supplemental content (e.g., context content 215) to the contact center agent computing device 225 leverages the transfer or routing of prior data messages as, for example, the context content used to enhance a second data message 205 can be responsive to a first data message 205. This results in more efficient or more direct routing or processing of data messages 205 and can lead to faster conclusions of sessions between the customer computing device and the contact center environment that includes the cloud callback platform 101. The more efficient routing and processing reduces the volume of computer network data transmissions and computer processing operations, which reduces latency, saves processing capacity, and saves electrical power relative to contact center environment that does not include context summary reports 220.

Figure 3:
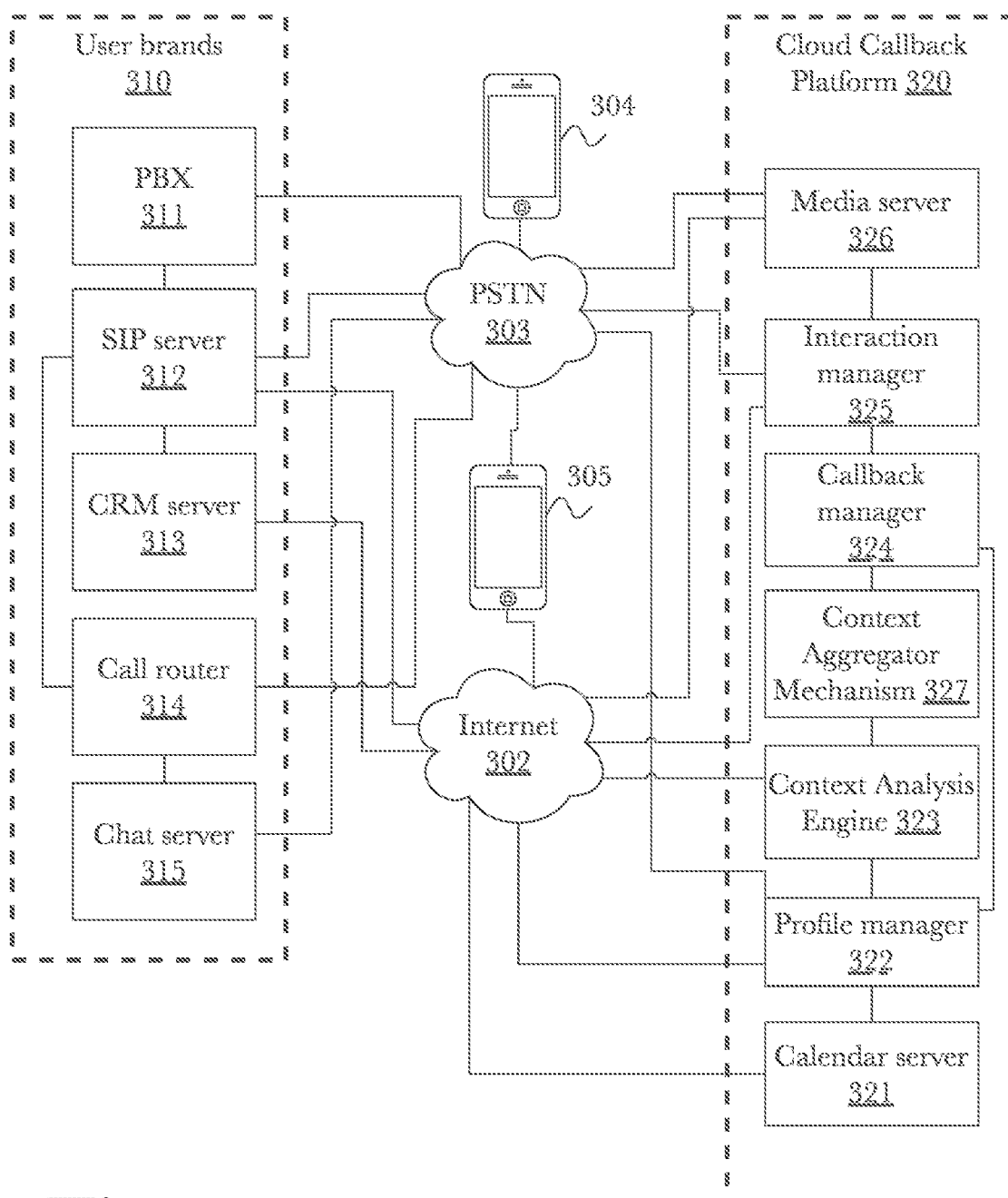
FIG. 3 is a block diagram illustrating an exemplary system architecture for a cloud callback platform operating including a calendar server, over a public switched telephone network and internet, to a variety of other brand devices and services, according to an embodiment.

FIG. 3 is a block diagram illustrating an exemplary system architecture for a cloud callback platform including a calendar server operating over a public switched telephone network and the Internet, and connected to a variety of other brand devices and services, according to an embodiment. According to this embodiment, many user brands 310 are present, including PBX system 311, a SIP server 312, a CRM server 313, a call router 314, and a chat server 315, which may be connected variously to each other as shown, and connected to a PSTN 303 and the Internet 302, which further connect to a cellular phone 305 and a landline 304 or other phone that may not have internet access. As further shown, cloud callback platform 320 contains multiple components, including a calendar server 321, profile manager 322, context analysis engine 323, callback manager 324, interaction manager 325, media server 326, and a data message aggregator 327, which similarly to user brands 310 may be interconnected in various ways as depicted in the diagram, and connected to either a PSTN 303 or the internet 302.

A calendar server 321, according to the embodiment, is a server which may store and retrieve, either locally or from internet-enabled services associated with a user, calendars which hold data on what times a user may be available or busy (or some other status that may indicate other special conditions, such as to allow only calls from certain sources) for a callback to take place. A calendar server 321 connects to the internet 302, and to a profile manager 322, to determine the times a callback requestor and callback recipient may both be available.

Figure 4:
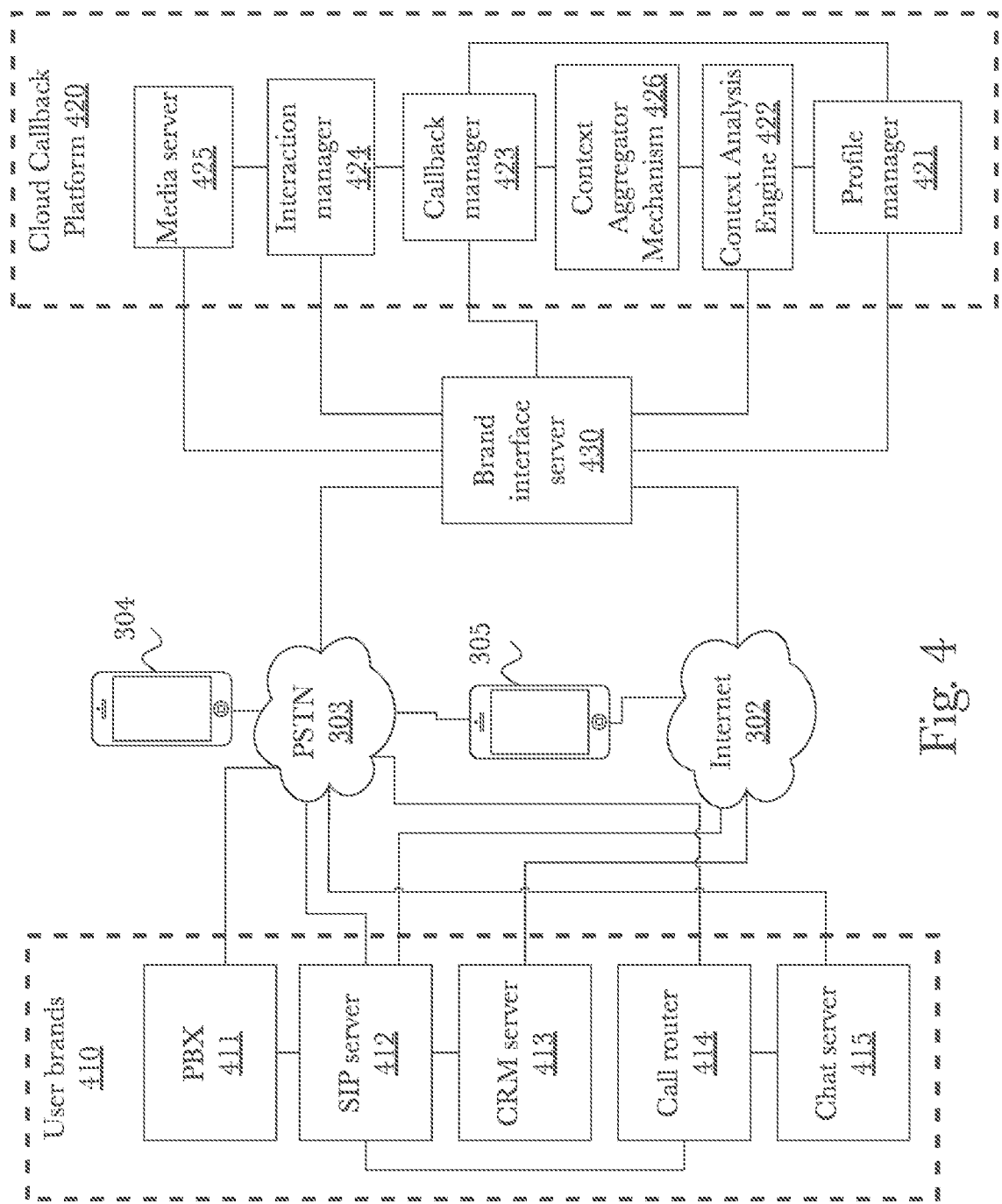
FIG. 4 is a block diagram illustrating an exemplary system architecture for a cloud callback platform operating including a brand interface server, over a public switched telephone network and internet, to a variety of other brand devices and services, according to an embodiment.

FIG. 4 is a block diagram illustrating an exemplary system architecture for a cloud callback platform including a brand interface server, operating over a public switched telephone network and the Internet, and connected to a variety of other brand devices and services, according to an embodiment. According to this embodiment, many user brands 410 are present, including PBX system 411, a SIP server 412, a CRM server 413, a call router 414, and a chat server 415, which may be connected variously to each other as shown, and connected to a PSTN 303 and the Internet 302, which further connect to a cellular phone 305 and a landline 304 or other phone that may not have internet access. As further shown, cloud callback platform 420 contains multiple components, including a profile manager 421, context analysis engine 422, callback manager 423, interaction manager 424, media server 425, and a data message aggregator 426, which similarly to user brands 410 may be interconnected in various ways as depicted in the diagram, and connected to either a PSTN 303 or the internet 302.

Present in this embodiment is a brand interface server 430, which may expose the identity of, and any relevant API's or functionality for, any of a plurality of connected brands 410, to elements in a cloud callback platform 420. In this way, elements of a cloud callback platform 420 may be able to connect to, and interact more directly with, systems and applications operating in a business' infrastructure such as a SIP server 412, which may be interfaced with a profile manager 421 to determine the exact nature of a user's profiles, sessions, and interactions in the system for added precision regarding their possible availability and most importantly, their identity.

Figure 5:
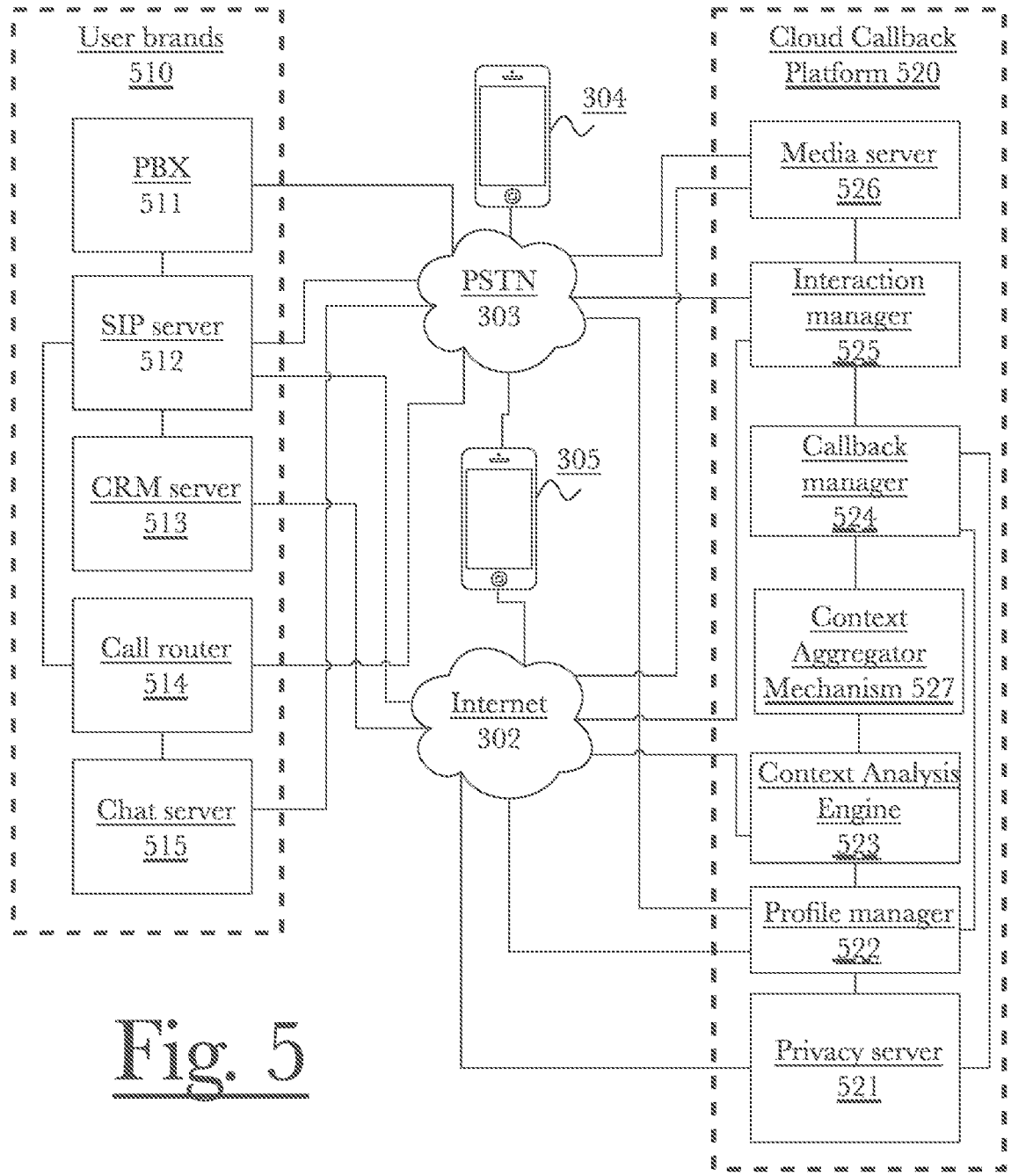
FIG. 5 is a block diagram illustrating an exemplary system architecture for a cloud callback platform operating including a privacy server, over a public switched telephone network and internet, to a variety of other brand devices and services, according to an embodiment.

FIG. 5 is a block diagram illustrating an exemplary system architecture for a cloud callback platform including a privacy server, operating over a public switched telephone network and the Internet, and connected to a variety of other brand devices and services, according to an embodiment. According to this embodiment, many user brands 510 are present, including PBX system 511, a SIP server 512, a CRM server 513, a call router 514, and a chat server 515, which may be connected variously to each other as shown, and connected to a PSTN 303 and the Internet 302, which further connect to a cellular phone 305 and a landline 304 or other phone that may not have internet access. Further shown is a cloud callback platform 520 contains multiple components, including a profile manager 522, context analysis engine 523, callback manager 524, interaction manager 525, media server 526, and a context aggregator mechanism 527, which similarly to user brands 510 may be interconnected in various ways as depicted in the diagram, and connected to either a PSTN 303 or the internet 302.

In this embodiment, a privacy server 521 may connect to the internet 302, and to a profile manager 522 as well as a callback manager 524, and allows for callback requestors to first be validated using trust-circles to determine if they are a trusted user. A trusted user may be defined using a variety of criteria (that may vary according to the user, interaction, device, enterprise, or other context), and may for example comprise a determination of whether the callback requestor is a friend or family member, or is using a trusted brand such as a piece of equipment from the same company that the callback recipient works at, or if the callback requestor is untrusted or is contacting unknown recipients, to determine if a callback request is permitted based on user settings. Further, a privacy server 521 may encrypt one or both of incoming and outgoing data from a callback manager 524 in such a way as to ensure that, for example, a callback recipient might not know who requested the callback, or their profile may not be visible to the recipient, or vice versa, and other privacy options may also be enabled as needed by a corporation. Encryption may utilize public or private keys, or may utilize perfect forward secrecy (such that even the enterprise routing the call cannot decrypt it), or other encryption schema or combinations thereof that may provide varying features or degrees of privacy, security, or anonymity (for example, one enterprise may permit anonymous callbacks while another may require a user to identify themselves and may optionally verify this identification).

Figure 6:
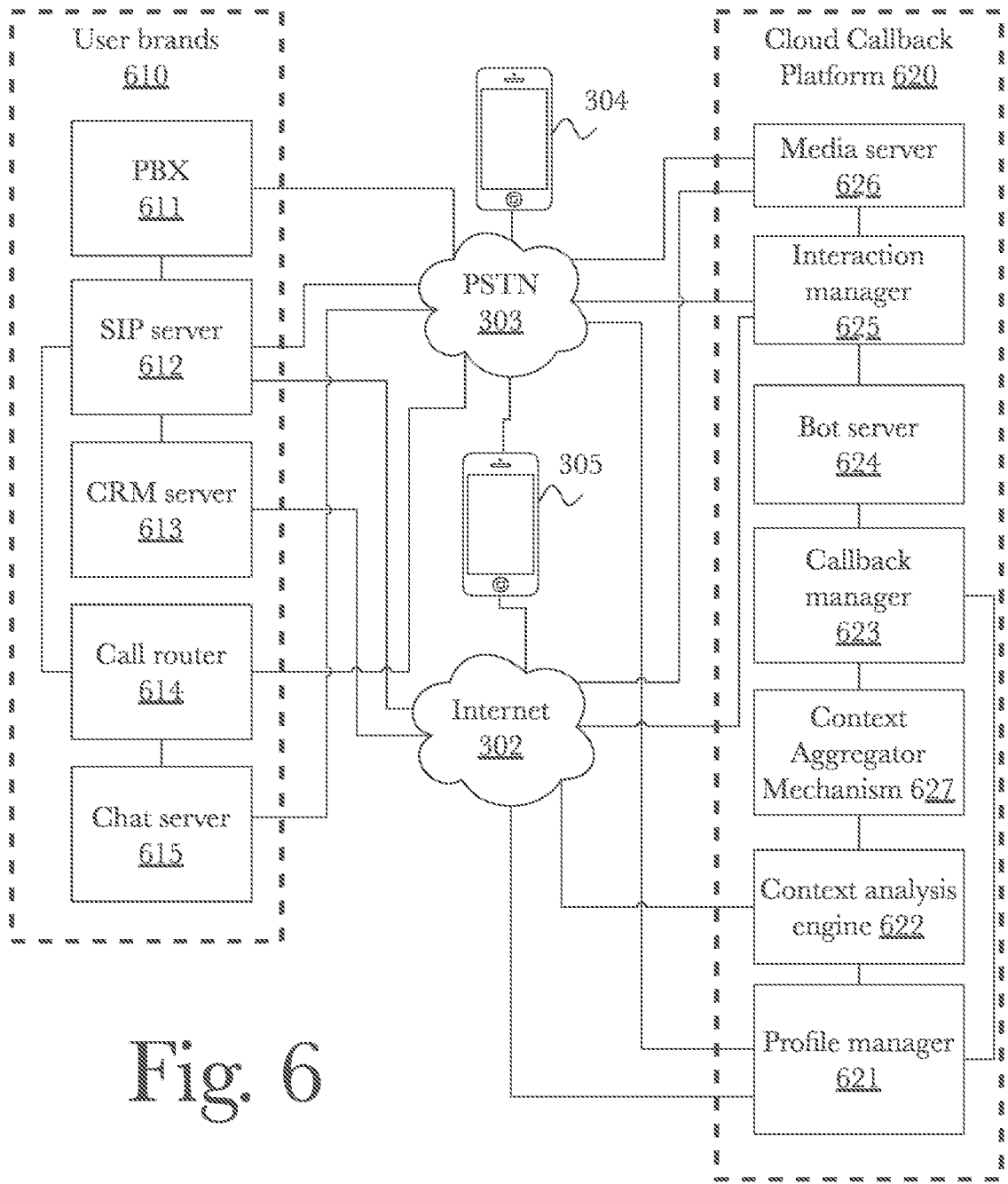
FIG. 6 is a block diagram illustrating an exemplary system architecture for a cloud callback platform operating including a bot server, over a public switched telephone network and internet, to a variety of other brand devices and services, according to an embodiment.

FIG. 6 is a block diagram illustrating an exemplary system architecture for a cloud callback platform including a bot server, operating over a public switched telephone network and the Internet, and connected to a variety of other brand devices and services, according to an embodiment. According to this embodiment, many user brands 610 are present, including PBX system 611, a SIP server 612, a CRM server 613, a call router 614, and a chat server 615, which may be connected variously to each other as shown, and connected to a PSTN 303 and the Internet 302, which further connect to a cellular phone 305 and a landline 304 or other phone that may not have internet access. As further shown, a cloud callback platform 620 contains multiple components, including a profile manager 622, context analysis engine 623, callback manager 624, interaction manager 625, media server 626, and a context aggregator mechanism 627, which similarly to user brands 610 may be interconnected in various ways as depicted in the diagram, and connected to either a PSTN 303 or the internet 302.

In the present embodiment, a bot server 624 also is present in a cloud callback platform 620, which allows for communication with a callback requestor. Bot server 624 allows a user to specify, through any available data type such as (including, but not limited to) SMS texting, email, or audio data, any desired parameters for the callback they would like to request. This is similar to an ACD system used by individual call-centers, but exists as a separate server 624 in a cloud callback platform 620 which may then be configured as-needed by a hosting company, and behaves akin to an automated secretary, taking user information down to specify a callback at a later time from the callback recipient.

Figure 7:
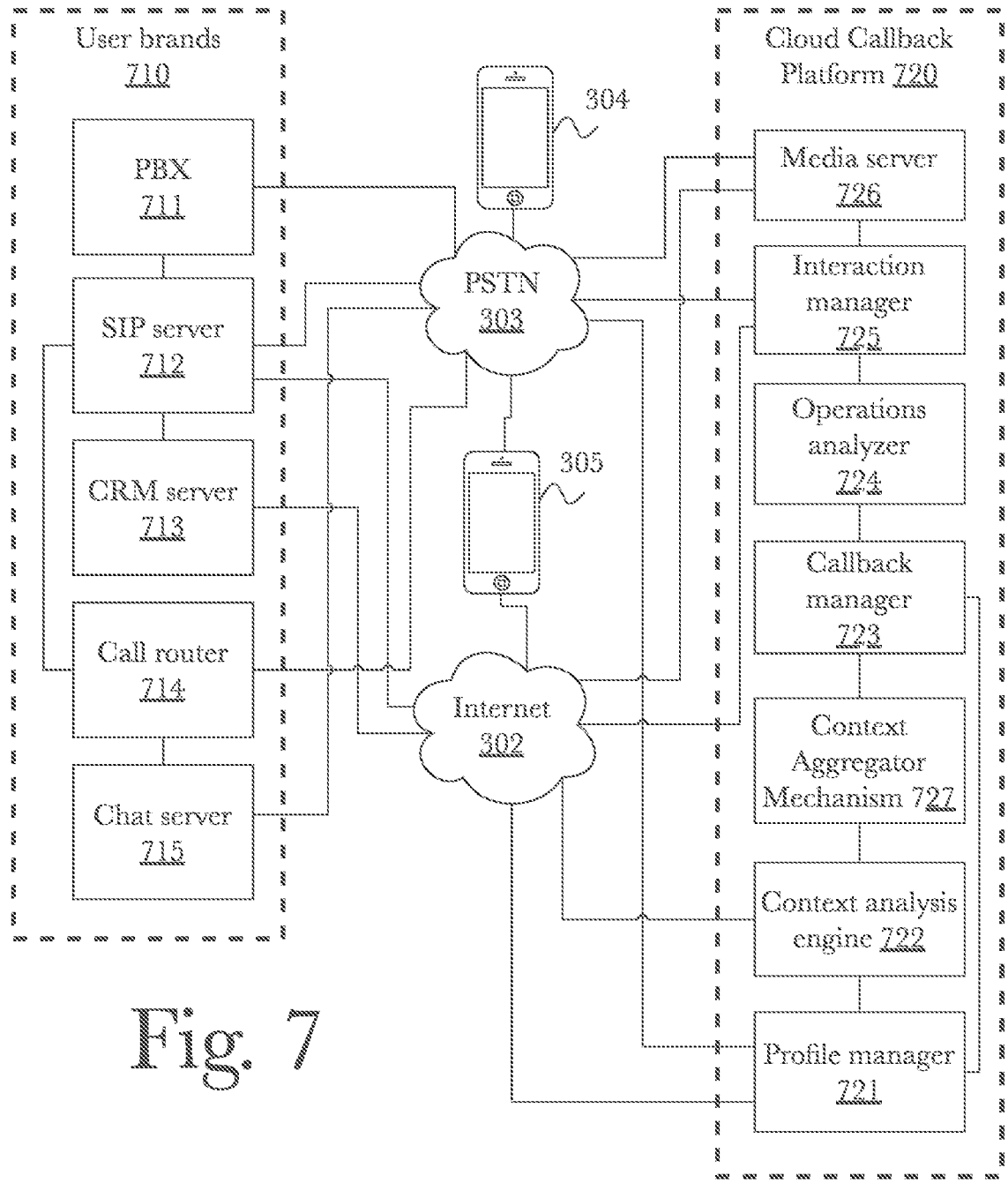
FIG. 7 is a block diagram illustrating an exemplary system architecture for a cloud callback platform operating including an operations analyzer over a public switched telephone network and internet, to a variety of other brand devices and services, according to an embodiment.

FIG. 7 is a block diagram illustrating an exemplary system architecture for a cloud callback platform including an operations analyzer operating over a public switched telephone network and the Internet, and connected to a variety of other brand devices and services, according to an embodiment. According to this embodiment, many user brands 710 are present, including PBX system 711, a SIP server 712, a CRM server 713, a call router 714, and a chat server 715, which may be connected variously to each other as shown, and connected to a PSTN 303 and the Internet 302, which further connect to a cellular phone 305 and a landline 304 or other phone that may not have internet access. As further shown, a cloud callback platform 720 contains multiple components, including a profile manager 721, context analysis engine 722, callback manager 723, interaction manager 725,media server 726, and a context aggregator mechanism 727, which similarly to user brands 710 may be interconnected in various ways as depicted in the diagram, and connected to either a PSTN 303 or the internet 302.

In this embodiment, an operations analyzer 724 is present, which may determine a particular channel to be used to reach a callback recipient and callback requestor, for example (and not limited to), VoIP services such as SKYPE™ or DISCORD™, a PSTN phone connection, any particular phone number or user accounts to connect using, or other service, to determine the optimal method with which to reach a user during a callback. An operations analyzer 724 may also analyze and determine the points of failure in a cloud callback platform 720, if necessary, for example if a callback attempt fails to connect operations analyzer 724 may bridge a callback requestor and recipient using an alternate communication channel to complete the callback at the scheduled time.

Figure 8:
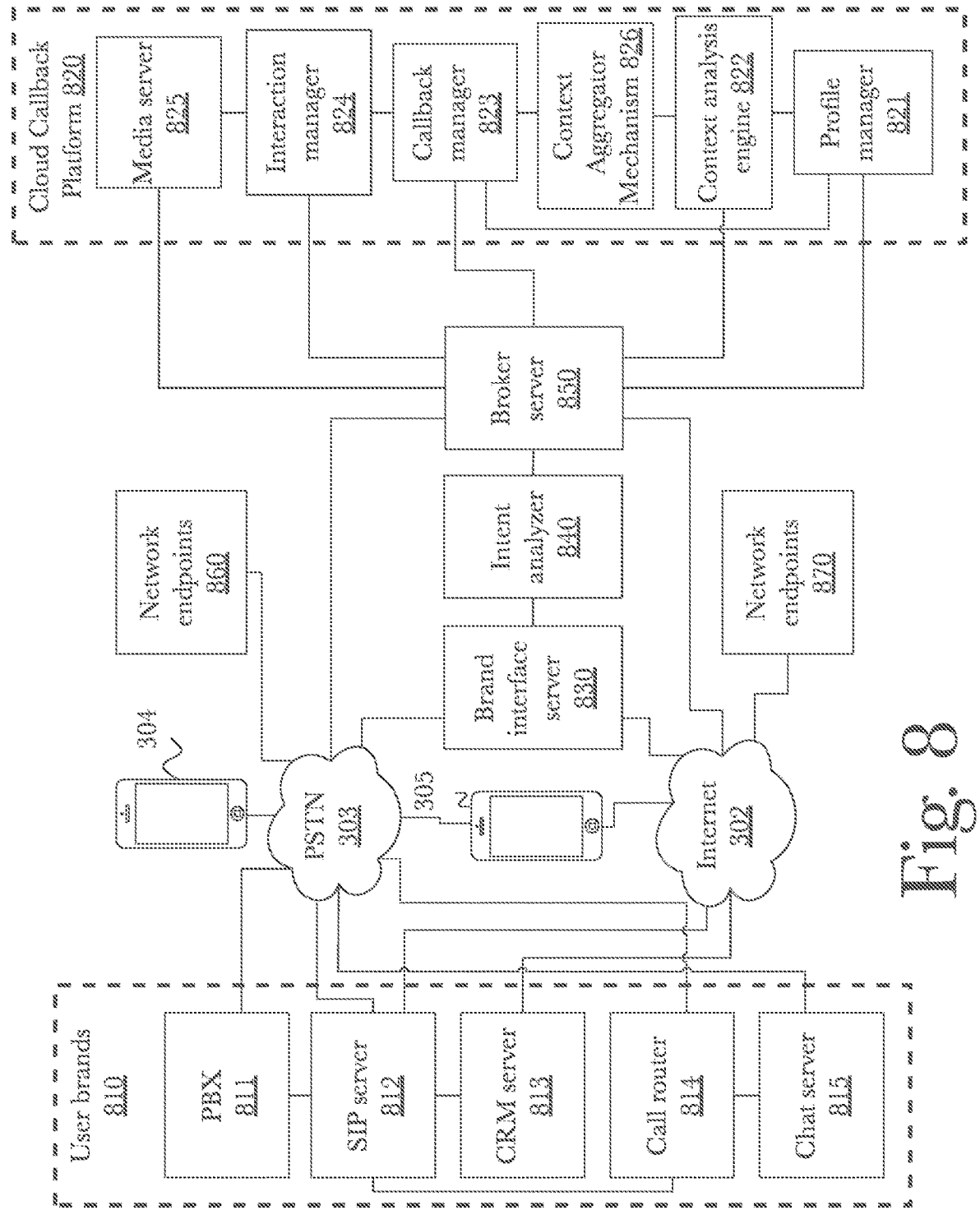
FIG. 8 is a block diagram illustrating an exemplary system architecture for a cloud callback platform including a brand interface server, an intent analyzer, and a broker server, operating over a public switched telephone network and internet, to a variety of other brand devices and services, according to an embodiment.

FIG. 8 is a block diagram illustrating an exemplary system architecture for a cloud callback platform including a brand interface server, an intent analyzer, and a broker server, operating over a public switched telephone network and internet, and connected to a variety of other brand devices and services, according to an embodiment. According to this embodiment, many user brands 810 are present, including PBX system 811, a SIP server 812, a CRM server 813, a call router 814, and a chat server 815, which may be connected variously to each other as shown, and connected to a PSTN 303 and the Internet 302, which further connect to a cellular phone 305 and a landline 304 or other phone that may not have internet access. As further shown, a cloud callback platform 820 contains multiple components, including a profile manager 821, context analysis engine 822, callback manager 823, interaction manager 824, media server 825, and a context aggregator mechanism 826, which similarly to user brands 810 may be interconnected in various ways as depicted in the diagram, and connected to either a PSTN 303 or the internet 302. Also present are a plurality of network endpoints 860, 870, connected to either or both of the internet 102 and a PSTN 103, such network endpoints representing contact points other than a landline 121 or cell phone 112, including laptops, desktops, tablet computers, or other communication devices.

Present in this embodiment is a brand interface server 830, which may expose the identity of, and any relevant API's or functionality for, any of a plurality of connected brands 810, to an intent analyzer 840. In this way, elements of a cloud callback platform 820 may be able to connect to, and interact more directly with, systems and applications operating in a business' infrastructure such as a SIP server 812, which may be interfaced with a profile manager 821 to determine the exact nature of a user's profiles, sessions, and interactions in the system for added precision regarding their possible availability and most importantly, their identity. An intent analyzer 840 may analyze spoken words or typed messages from a user that initiated the callback request, to determine their intent for a callback, as well as forward data received from a brand interface server. For example, their intent may be to have an hour-long meeting, which may factor into the decision by a cloud callback platform 820 to place a call shortly before one or both users may be required to start commuting to or from their workplace. An intent analyzer 840 may forward all data through a broker server 850 which may allocate specific actions and responses to take between third-party brands 810 and cloud callback platform 820 components, as needed, as well as forward all data from the exposed and interfaced elements with the cloud callback platform 820.

Figure 9:
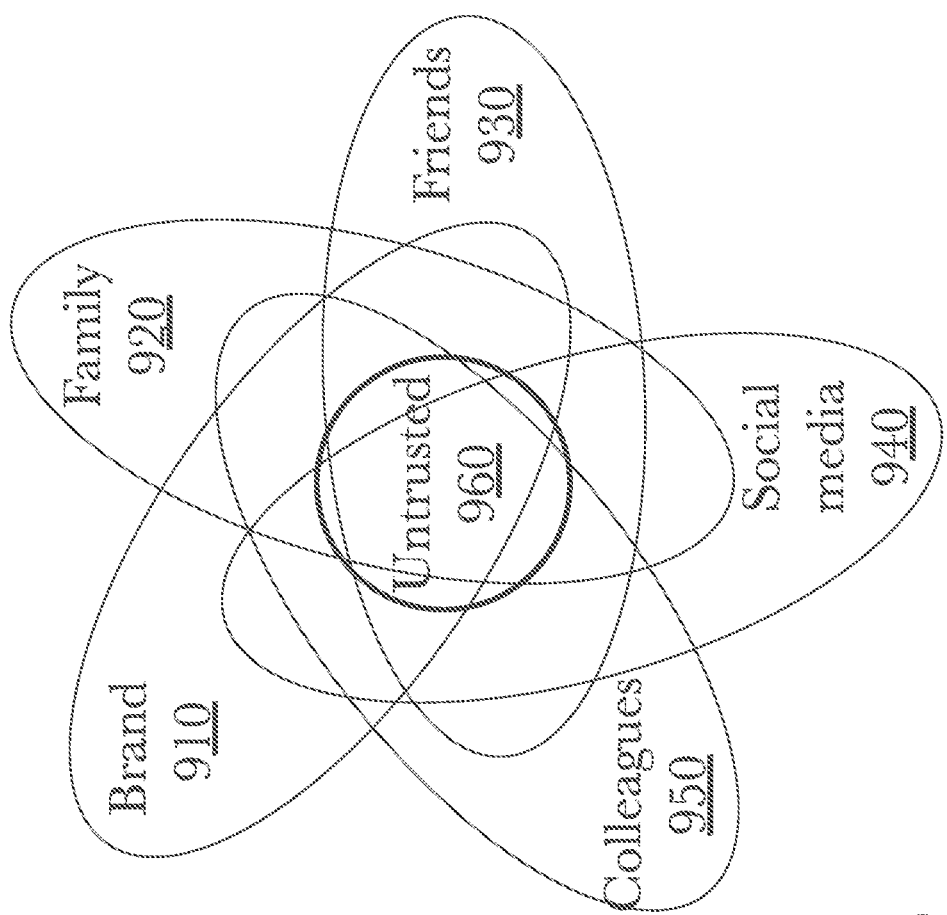
FIG. 9 is a diagram illustrating trust circles of levels of privacy for a user of a cloud callback platform, according to an aspect.

FIG. 9 is a diagram illustrating trust circles of levels of privacy for a user of a cloud callback platform, according to an aspect. These trust circles are data constructs enforced by a privacy server 621 which are determined with a profile manager 622, which indicate the level of trust that callers may possess, and therefore the system's ability to schedule a callback with the caller and the recipient. A caller who calls from a recognized brand 910, for example a company's phone forwarded through their PBX 611, may be recognized as having the highest level of trust, due to coming from a recognized source within the same organization. Family 920 may (for example) be the second highest level of trust, allowing for just as many privileges with callbacks, or perhaps restricting callback requests to only certain hours, to prevent users from being disrupted during certain work hours. A callback recipient's friends 930 may occupy a level of trust lower than that of family, representing users less-trusted than family 920 callers, and may yet have more restricted access to making callback requests for a user, and a continuing, descending hierarchy may be used to model additional levels of trust. For example, additional trust levels may include (but are not limited to) social media 940 recognized users, colleagues 950 which may represent individuals only loosely affiliated with a potential callback recipient, and untrusted 960, representing users who are known to the system and deemed banned or untrustworthy, having the lowest ability to request an automated callback connection with a user. A further level of trust may exist, outside of the trust-circle paradigm, representing unknown contacts 970, which, depending on the settings for an individual user or an organization using a cloud callback platform system 620, may be unable to request callbacks, or may only be able to request callbacks at certain restricted hours until they are set to a higher level of trust in the system, according to a preferred embodiment.

As shown in FIG. 9, trust circles need not be implicitly hierarchical in nature and may overlap in various ways similar to a logical Venn diagram. For example one individual may be a friend and also known on social media, or someone may be both family and a colleague (as is commonplace in family businesses or large companies that may employ many people). As shown, anybody may be considered "untrusted" regardless of their other trust groupings, for example if a user does not wish to receive callbacks from a specific friend or coworker. While the arrangement shown is one example, it should be appreciated that a wide variety of numerous overlapping configuration may be possible with arbitrary complexity, as any one person may be logically placed within any number of groups as long as the trust groupings themselves are not exclusive (such as a group for coworkers and one for individuals outside the company).

Expanding on the notion of trust circles, there may also be logical "ability" circles that correspond to various individuals' capabilities and appropriateness for various issues, such as (for example) tech support skill or training with specific products, or whether a member of a brand 910 is actually a member of the best brand to handle a specific reason for a callback, based on the callback request context. For example, a customer requesting a callback for assistance with booking a flight may not be adequately served by employees of airlines that don't offer flights to their intended destination, so combining the brand trust zone 910 with a capability map would indicate to the callback system which individuals are more appropriate for the callback in question. This expands from merely trusting certain users and discarding others, to a form of automated virtual concierge service that finds the user for a callback request that is most capable and relevant to the request, ensuring optimum handling of the callback requestor's needs.

Detailed Description of Exemplary Aspects

Figure 10:
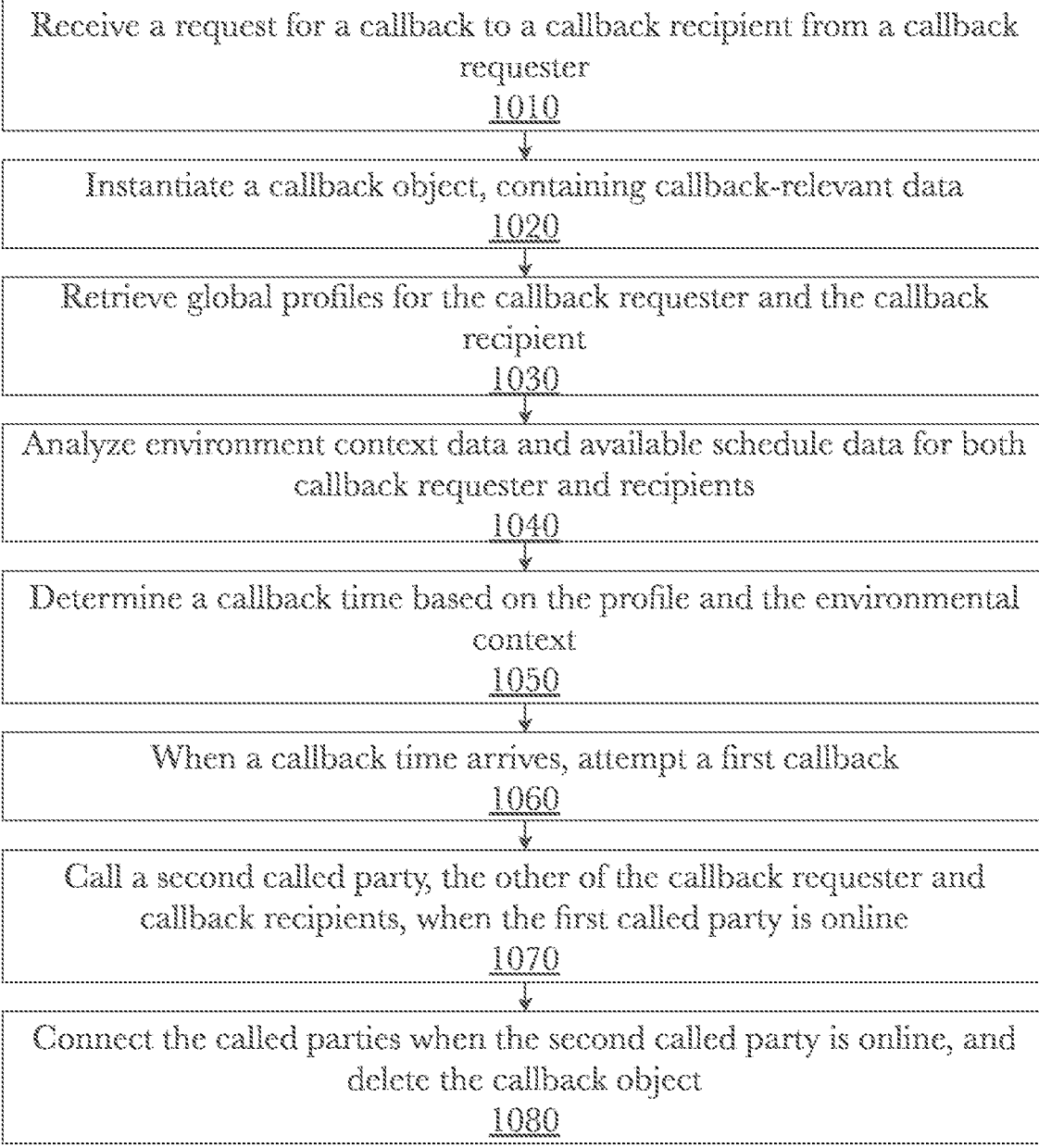
FIG. 10 is a method diagram illustrating the use of a cloud callback platform for intent-based active callback management, according to an embodiment.

FIG. 10 is a method diagram illustrating the use of a cloud callback platform for callback management, according to an embodiment. According to an embodiment, a cloud callback platform 220 must receive a request for a callback to a callback recipient, from a callback requester 1010. This refers to an individual calling a user of a cloud callback system 220, being unable to connect for any reason, and the system allowing the caller to request a callback, thus becoming the callback requester, from the callback recipient, the person they were initially unable to reach. A callback object is instantiated 1020, using a callback manager 223, which is an object with data fields representing the various parts of callback data for a callback requester and callback recipient, and any related information such as what scheduled times may be possible for such a callback to take place. Global profiles may then be retrieved 1030 using a profile manager 221 in a cloud callback system, as well as an analysis of environmental context data 1040, allowing for the system to determine times when a callback may be possible for a callback requestor and callback recipient both 1050. When such a time arrives, a first callback is attempted 1060 to the callback requestor or callback recipient, and if this succeeds, a second call is attempted to the second of the callback requestor and callback recipient 1070, allowing a media server 225 to bridge the connection when both are online, before deleting the callback object 1080.

Figure 11:
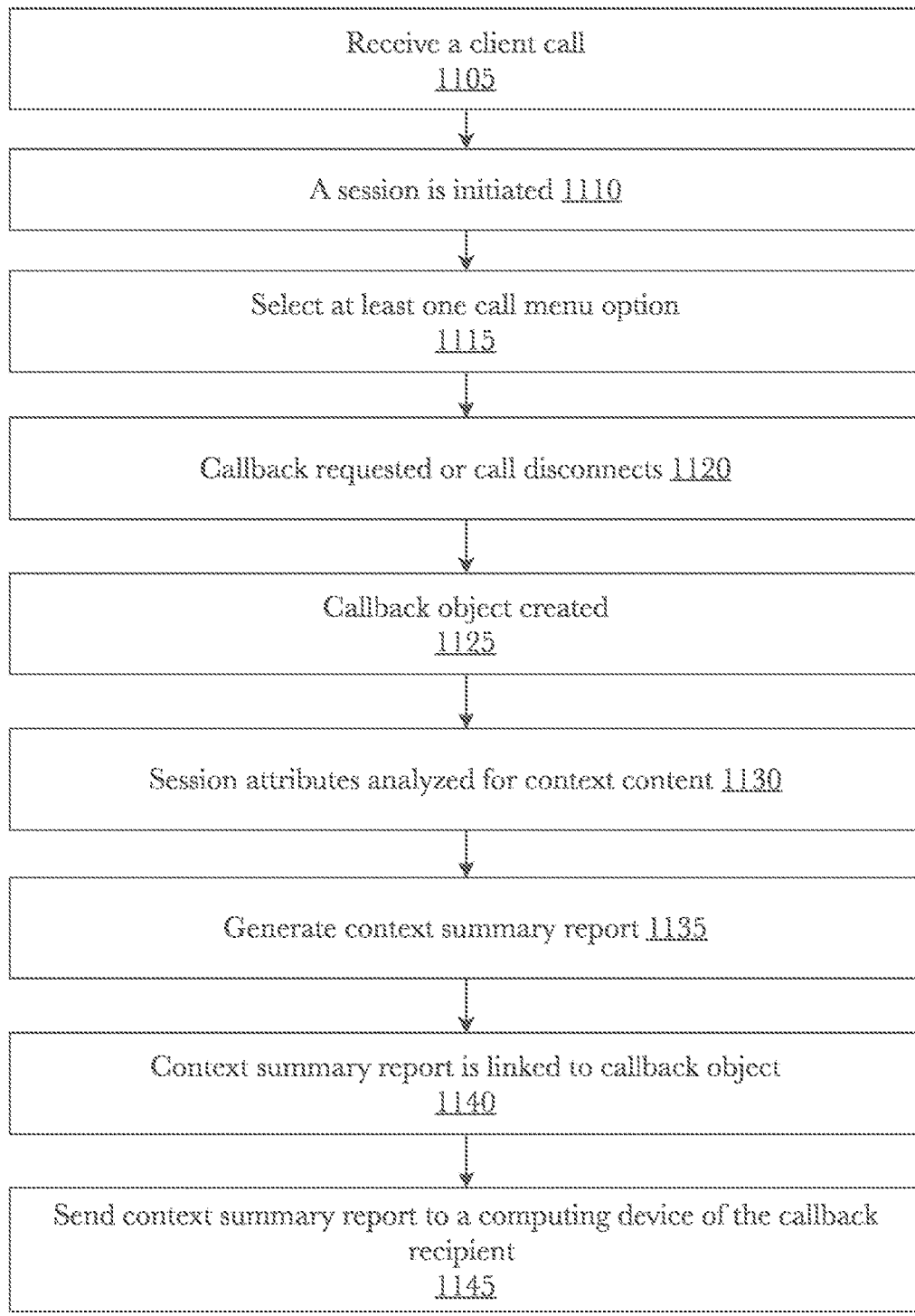
FIG. 11 is a method diagram illustrating the use of a cloud callback platform for generating a context summary report from a voice call, according to an embodiment.

FIG. 11 is a method diagram illustrating the use of a cloud callback platform for generating a context summary report from a voice call, according to an embodiment. In this embodiment, a cloud callback platform 101 must receive a client call 1105 to a business or service agent. A callback manager 155 initiates a session in response to reception of the client call 1110. The client may select or respond to at least one call menu option 1115 before a callback is requested or a call disconnects 1120. At that time the callback manager creates a callback object 1125 which can be used to manage, analyze, and execute callbacks between a callback requester and a callback recipient. Any available selections or responses to call menu options may be tagged as session attributes. Session attributes may be sent to and analyzed by a context analysis engine 160 which determines, generates, or derives contextual context 1130 related to the callback requester, the callback recipient, and the session attributes. The generated context content may be sent to context aggregator mechanism 175 which can generate a context summary report 1135. The context summary report 1135 may be formatted in a variety of ways such as (but not limited to) American standard code for information interchange ("ASCII"), extensible markup language ("XML"), hypertext markup language ("HTML"), or binary format for usability with a bot or script. The callback manager 155 may obtain the context summary report and link it to the callback object 1140. The callback manager 155 may send the context summary report, via a media server 170, to a computing device of the callback recipient 1145.

Figure 12:
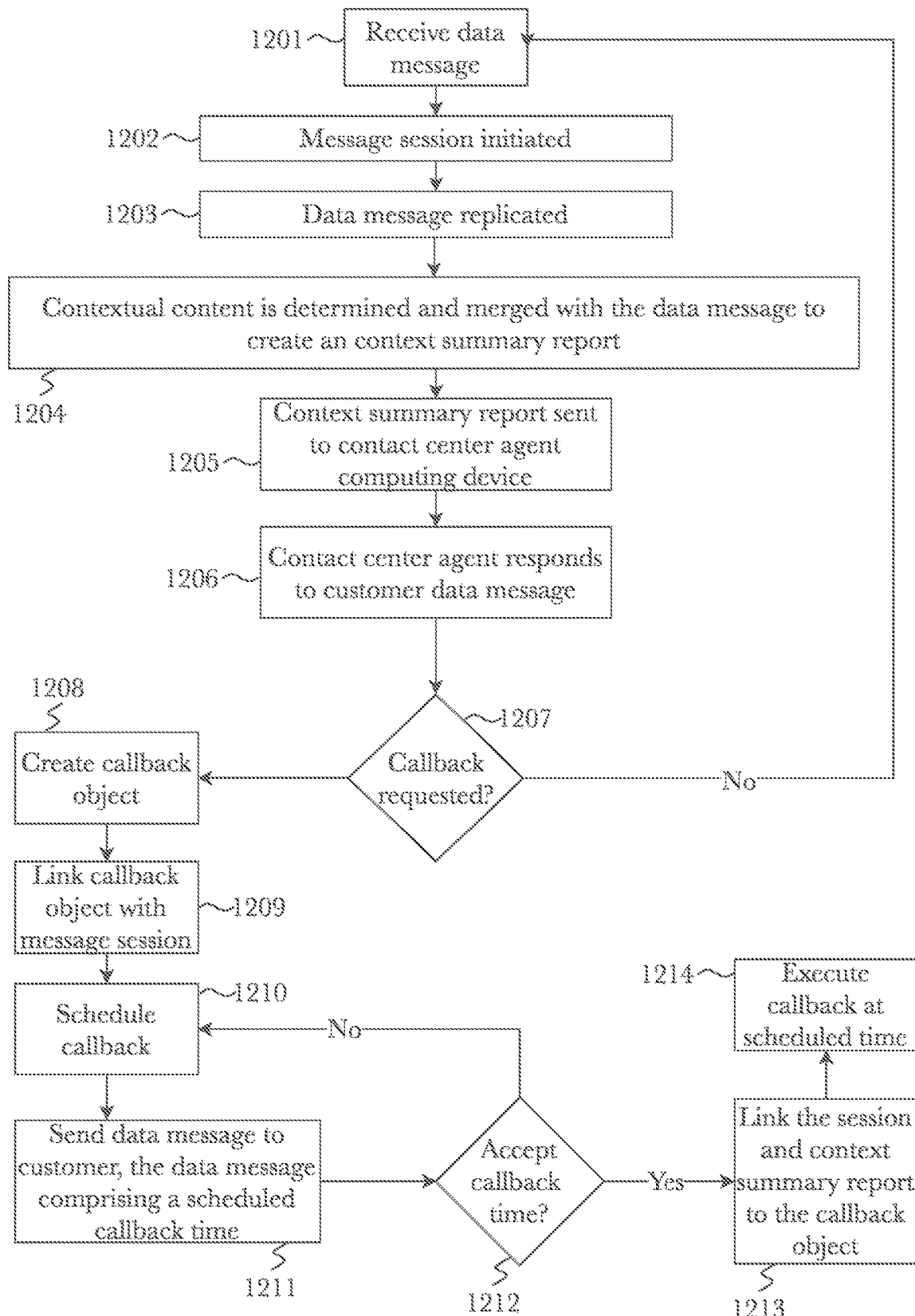
FIG. 12 is a block flow diagram illustrating an exemplary method for generating a context summary report from a text based data message session, according to an embodiment.

FIG. 12 is a block flow diagram illustrating an exemplary method for generating a context summary report from a text based data message session, according to an embodiment. In this embodiment, a cloud callback platform 101 must receive a text based data message 1201 from a client to a service agent. When a data message is received, a callback manager 155 may initiate a session 1202 that facilitates interactive communication between a client and service agent computing device. The callback manager may also replicate the data message 1203 and store it in a user profile managed by a profile manager 150. Session attributes and the data message (e.g., a replication) may be sent to a context analysis engine 160 which may determine, generate, or derive contextual content. Both the context content and data message may be sent to a context aggregator 175 which merges the two components to create a context summary report 1204. The context summary report may be sent to a service or contact center agent computing device 1205. Next, a contact center agent may respond 1206, in a manner informed by the context summary report, to the customer data message. At this point, the client may request a callback 1207. If no callback is requested, but rather the client sends another data message continuing the discussion (e.g., conversation) with the contact center agent, then the process repeats itself. If, however, a callback is requested then the callback manager 155 will create a callback object 1208, link the callback object with the session 1209, and schedule a callback 1210. The cloud based platform 101 may automatically send to the callback requester, a data message which contains the scheduled callback time 1211. A client may respond 1212 to the automated data message by accepting or rejecting the scheduled callback time. A client may respond in a variety of ways such as (but not limited to) using words, emojis, characters, or even pictures. The cloud callback platform 101 may utilize the context analysis engine 160 to determine the intent of a client response to a scheduled callback time. If the client responds in a negative way, then the callback manager schedule a new callback time 1210 and another automated data message is sent to the client asking for confirmation of the revised callback time. If the client responds in an affirmative manner, then the callback manager 155 may link the context summary report to the callback object 1213 and then the cloud callback platform 101 may execute the callback at the scheduled time 1214.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
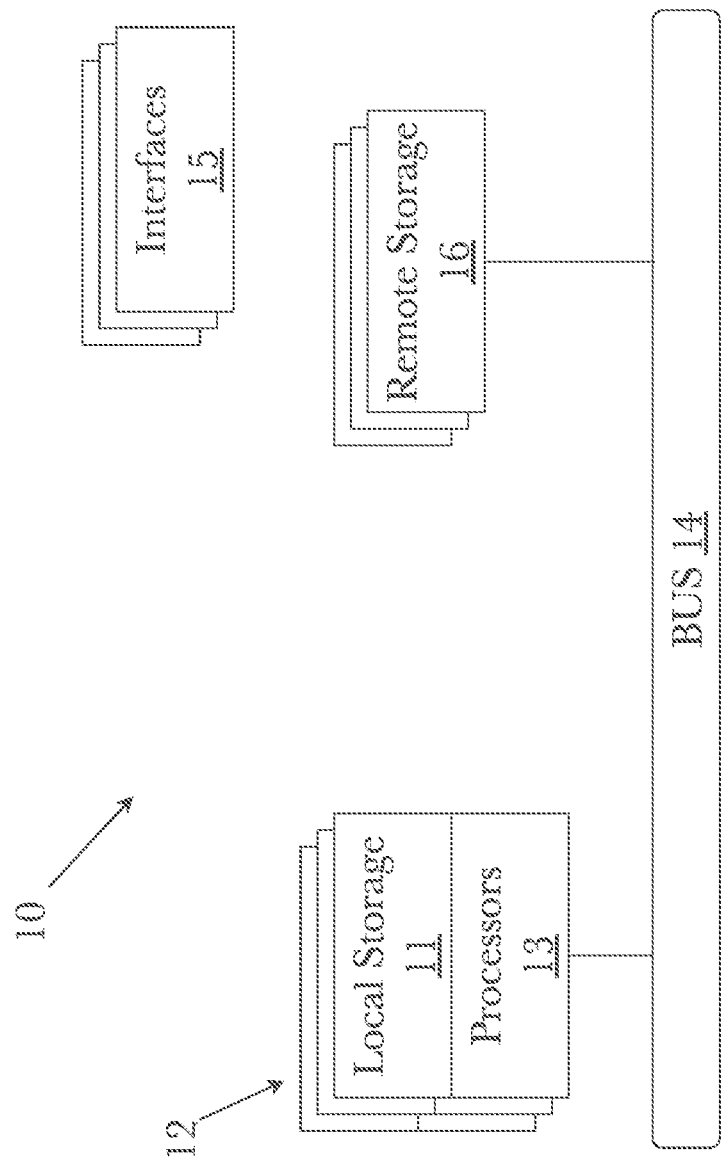
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
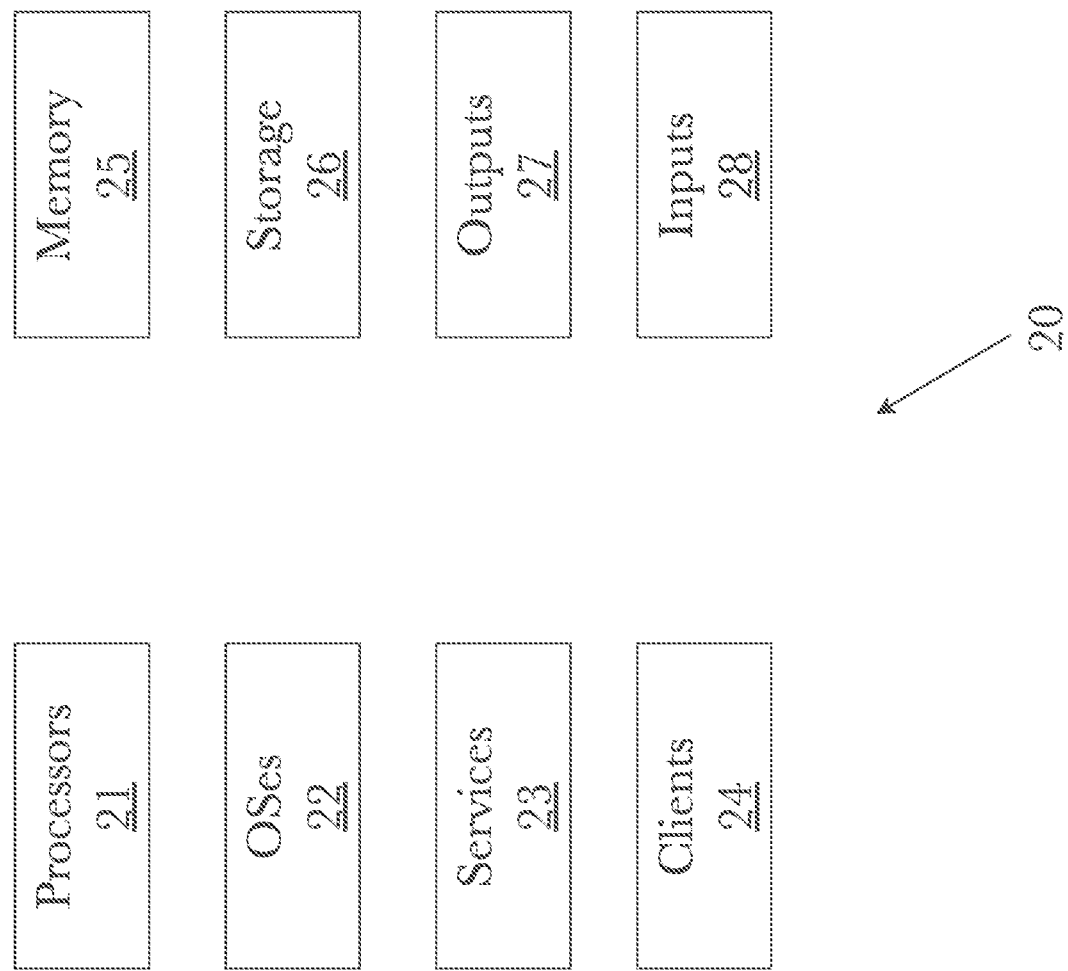
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
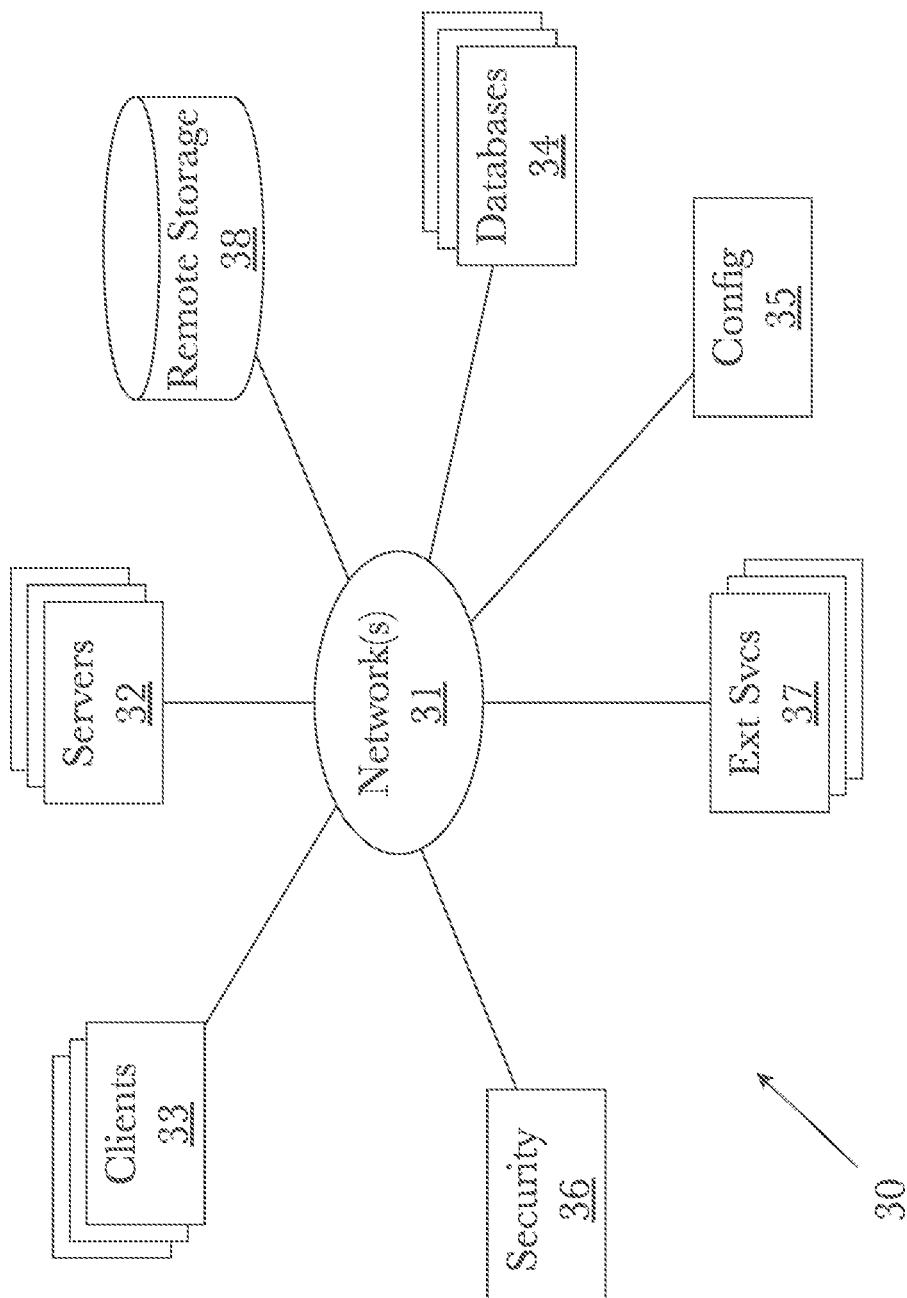
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 16:
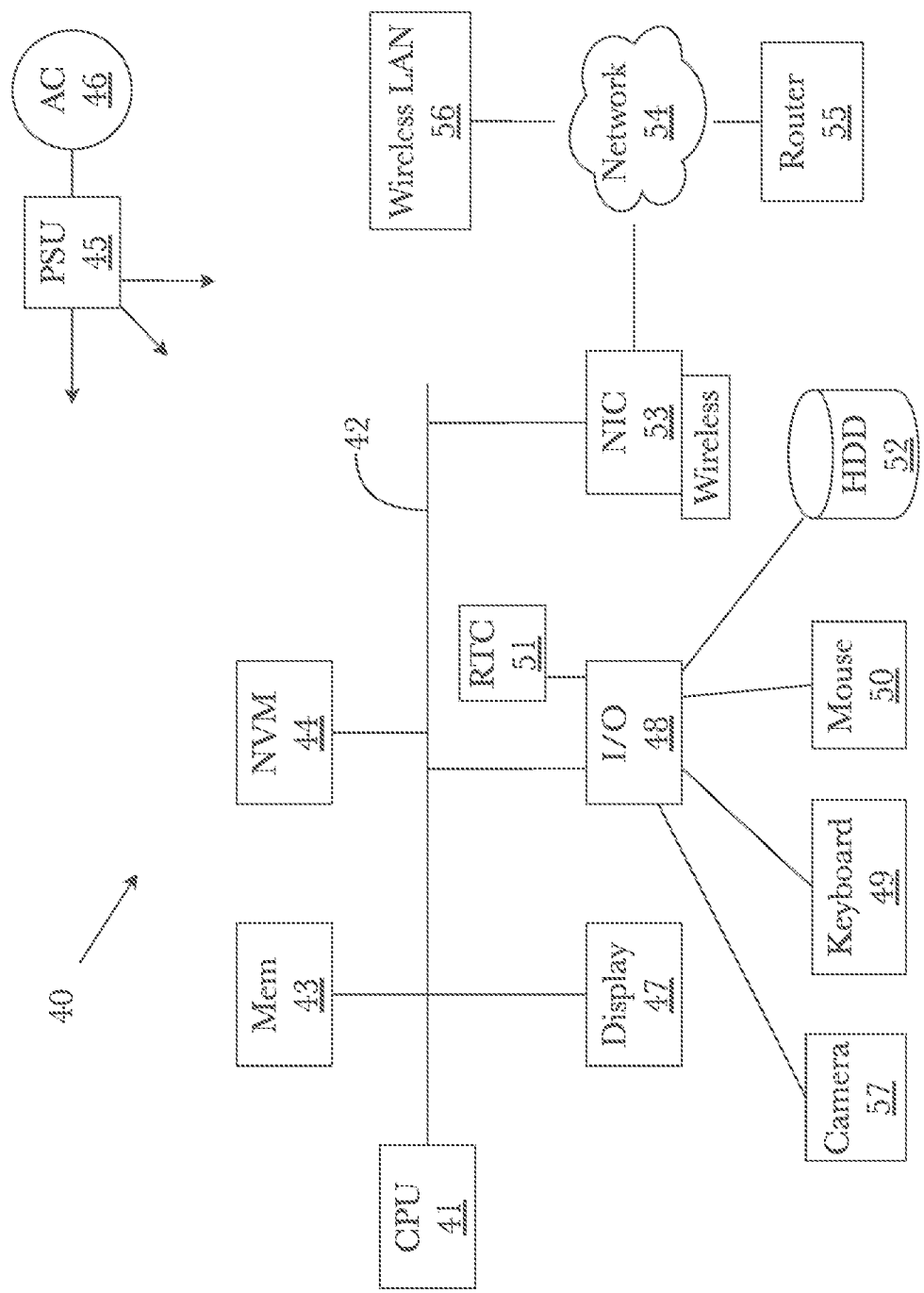
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for a cloud callback platform, comprising:
a computing device comprising a memory and a processor;
a callback manager comprising a first plurality of programming instructions stored in the memory and operating on the processor, wherein the first plurality of programming instructions, cause the computing device to:
  initiate a session when first contact is made with a callback requestor;
  receive a request for a callback to a callback recipient from a callback requester;
  instantiate a callback object;
  send session attributes to at least one of a context analysis engine and a data message aggregator;
  obtain a context summary report;
  link the context summary report and the callback object;
  provide the context summary report to the callback recipient at a scheduled callback time;
  execute callback requests; and a context analysis engine comprising a second plurality of programming instructions stored in the memory and operating on the processor, wherein the second plurality of programming instructions, cause the computing device to:
  receive the session attributes;
  generate, in response to the session attributes, context content pertaining to at least one of the callback requestor, the callback recipient, and the session attributes;
  forward the context content to a data message aggregator; and a context aggregator mechanism comprising a third plurality of programming instructions stored in the memory and operating on the processor, wherein the third plurality of programming instructions, cause the computing device to:
  generate a context summary report by parsing, aggregating, and formatting the context content;
  send the context summary report to the callback manager; and an operations analyzer comprising a fourth plurality of programming instructions stored in the memory and operating on the processor, wherein the fourth plurality of programming instructions, cause the computing device to:
  determine an appropriate communications channel to execute the callback between a callback requestor and a callback recipient;
  monitor for points of failure in the cloud callback platform; and
  bridge a callback requestor and callback recipient using an alternate communication channel when a callback attempt fails as a result of a monitored failure in the cloud callback platform.

2. A method for managing callbacks using a cloud callback platform, comprising the steps of:
initiating a session when first contact is made with a callback requestor;
receiving a request for a callback to a callback recipient from a callback requester;
instantiating a callback object;
sending session attributes to a context analysis engine;
obtaining a context summary report;
linking the context summary report and the callback object;
providing the context summary report to the callback recipient at a scheduled callback time;
executing callback requests;
receiving the session attributes;
generating, in response to the session attributes, context content pertaining to at least one of the callback requestor, the callback recipient, and the session attributes;
forwarding the context content to a data message aggregator;
generating a context summary report by parsing, aggregating, and formatting the context content;
sending the context summary report to the callback manager;
determining an appropriate communications channel to execute the callback between a callback requestor and a callback recipient;
monitoring for points of failure in the cloud callback platform; and bridging a callback requestor and callback recipient using an alternate communication channel when a callback attempt fails as a result of a monitored failure in the cloud callback platform.

* * * * *